United States Patent [19]

Hashimoto et al.

[11] Patent Number: 5,430,550
[45] Date of Patent: Jul. 4, 1995

[54] IMAGE READING APPARATUS WHICH CORRECTS FOR POSITIONAL AND ANGULAR DEVIATION BETWEEN THE IMAGE SENSOR AND THE DOCUMENT

[75] Inventors: Yoshiyuki Hashimoto, Machida; Hideaki Kusano, Isehara; Shinji Kamiyama, Tokyo; Seiichi Mogawa, Sagamihara, all of Japan

[73] Assignee: Minolta Camera Kabushiki Kaisha, Osaka, Japan

[21] Appl. No.: 898,199

[22] Filed: Jun. 12, 1992

[30] Foreign Application Priority Data

| Jun. 14, 1991 | [JP] | Japan | 3-169391 |
| Jun. 14, 1991 | [JP] | Japan | 3-169393 |
| Jun. 14, 1991 | [JP] | Japan | 3-169394 |
| Jun. 14, 1991 | [JP] | Japan | 3-169395 |

[51] Int. Cl.[6] .................... H04N 1/387; H04N 1/04
[52] U.S. Cl. .................... 358/488; 358/497; 382/295
[58] Field of Search ............ 358/488, 474, 497, 406; 382/45, 46, 44

[56] References Cited

U.S. PATENT DOCUMENTS

| 3,962,681 | 6/1976 | Requa et al. | 382/44 |
| 4,554,583 | 11/1985 | Saitoh et al. | 358/163 |
| 4,602,291 | 7/1986 | Temes | 358/221 |
| 4,682,242 | 7/1987 | Sugita | 358/285 |
| 4,695,155 | 9/1987 | Ishii et al. | 355/45 |
| 5,001,574 | 3/1991 | Shimizu et al. | 358/448 |
| 5,181,104 | 1/1993 | Sugishima et al. | 358/75 |

FOREIGN PATENT DOCUMENTS

| 59-38870 | 3/1984 | Japan | 382/45 |
| 61-295770 | 12/1986 | Japan | |

*Primary Examiner*—James J. Groody
*Assistant Examiner*—Cheryl Cohen
*Attorney, Agent, or Firm*—Burns, Doane, Swecker & Mathis

[57] ABSTRACT

In an image reader a frame image of a microfilm is projected on a line sensor with a projection lens and read. The projection lens is movable in the main scanning direction by a driving motor. The line sensor is movable in the subscanning direction by a driving motor. The line sensor is moved in the subscanning direction to apply preliminary scanning and detect positional deviation in the main scanning direction of the projected image, and the projection lens is moved in the main scanning direction corresponding to quantity of the positional deviation. When the frame image is inclined, it is rotated relatively to the main scanning direction by a prism to correct the inclination, and the projection lens is moved in the main scanning direction thereafter to correct positional deviation in the same direction.

20 Claims, 31 Drawing Sheets

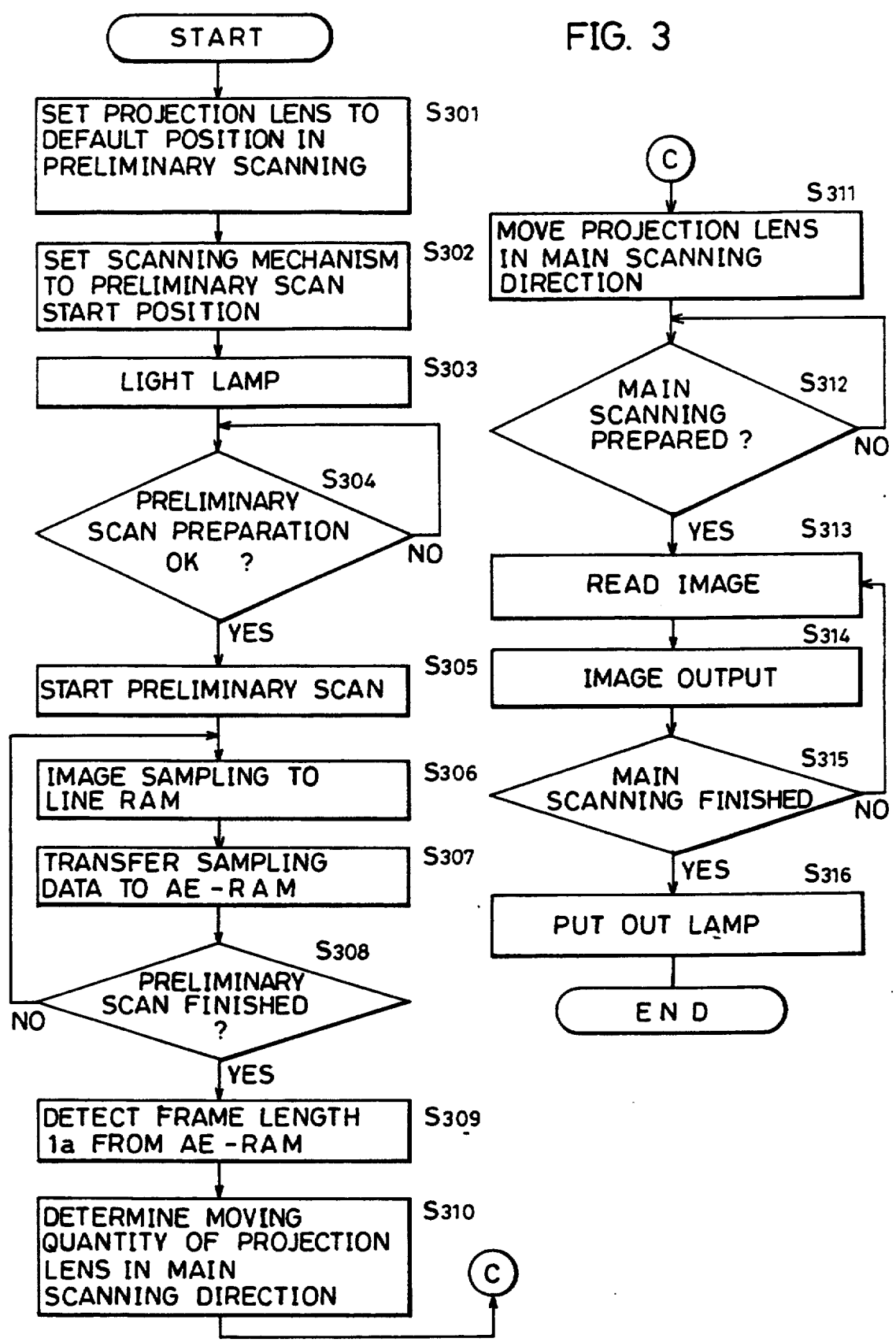

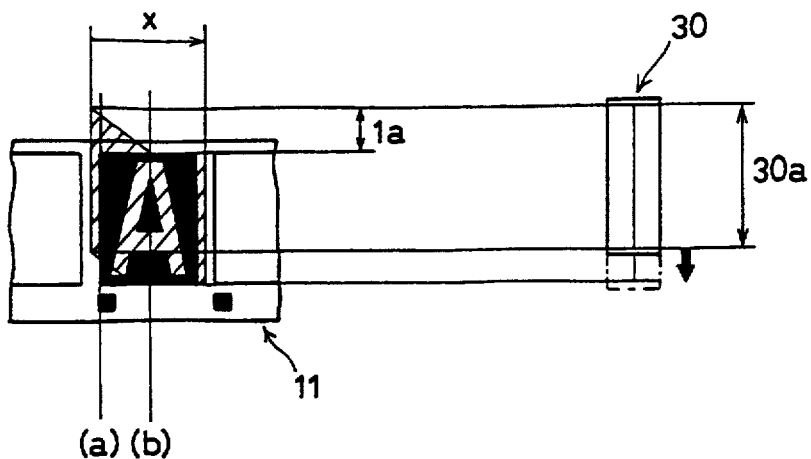
FIG. 8(A)
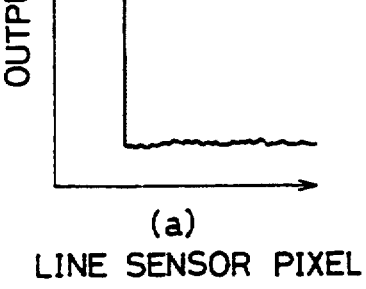
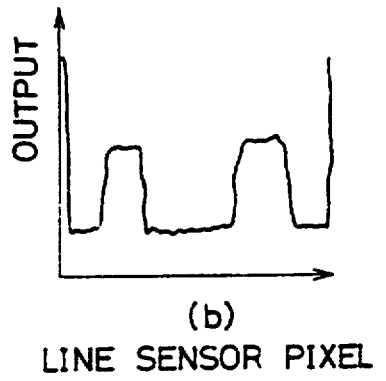
FIG. 8(B)
(a) LINE SENSOR PIXEL    (b) LINE SENSOR PIXEL
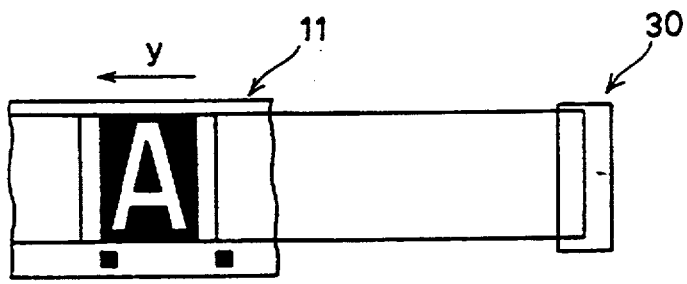
FIG. 8(C)
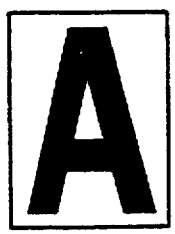
FIG. 8(D)

FIG. 15(A) PRIOR ART
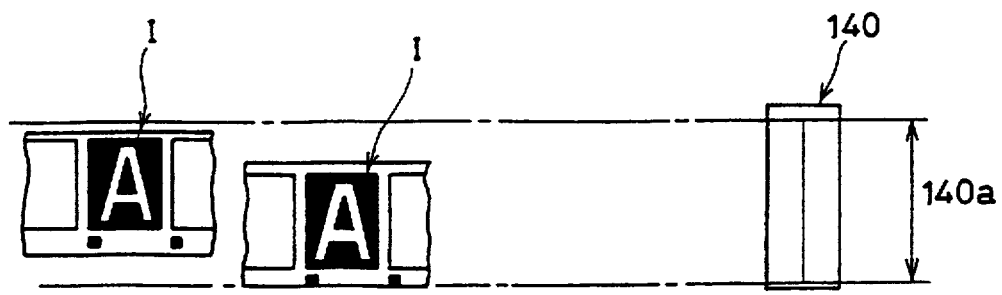
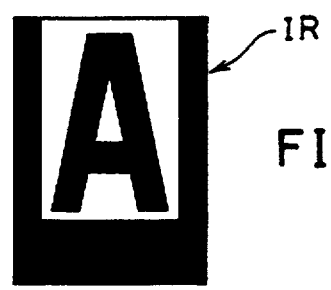
FIG. 15(B) PRIOR ART
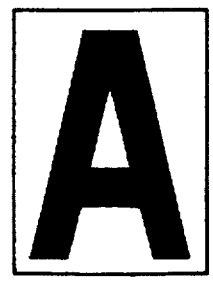
FIG. 15(C) PRIOR ART FIG. 16(A) PRIOR ART
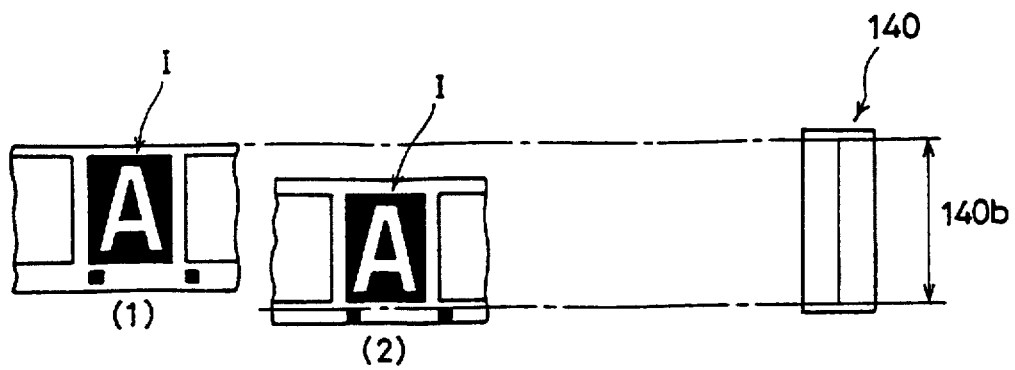
FIG. 16(B) PRIOR ART
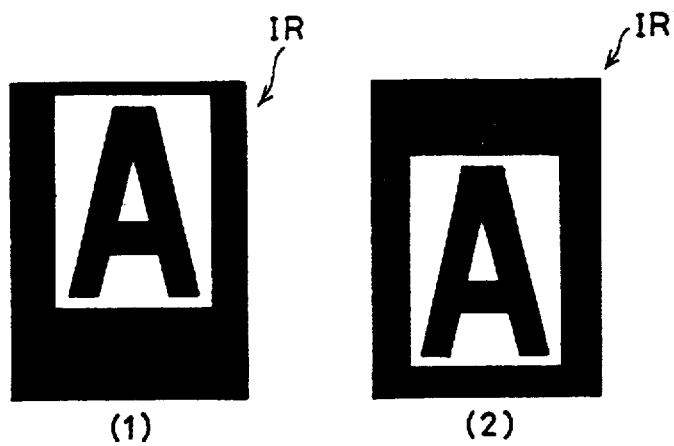
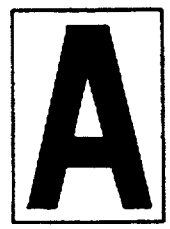
FIG. 16(C) PRIOR ART

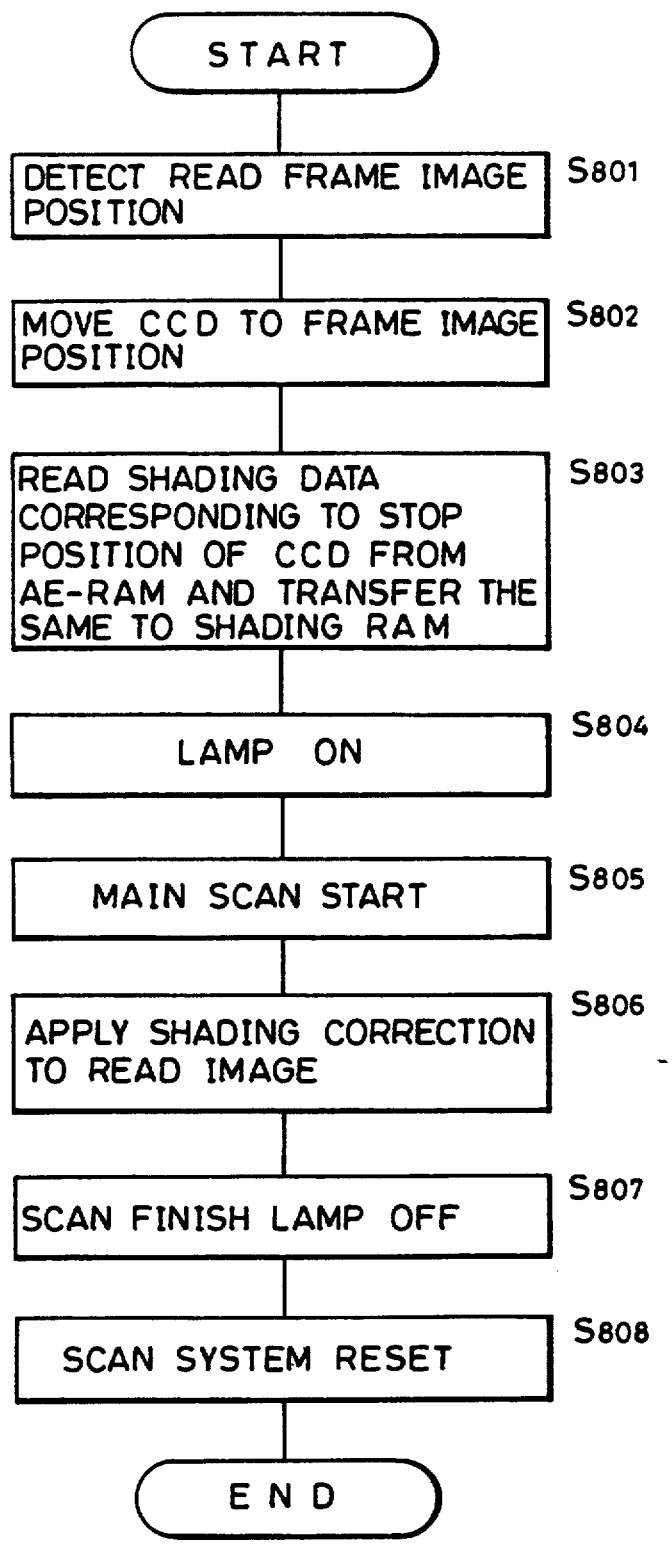

IMAGE READING APPARATUS WHICH CORRECTS FOR POSITIONAL AND ANGULAR DEVIATION BETWEEN THE IMAGE SENSOR AND THE DOCUMENT

BACKGROUND OF THE INVENTION

1. Field of the Invention

The present invention relates to image readers capable of automatically reading microfilms, and particularly to a line sensor for automatically reading microfilm using a line sensor with low cost and capable of obtaining high resolution.

2. Description of the Background Art

A micro-scanner is known as this kind of conventional image reader, for example. The micro-scanner includes a film carrier for holding a microfilm permitting it to run, an optical projecting system for radiating light upon the microfilm, a screen on which a micro image of the microfilm is projected, and a line sensor for reading an image projected on the screen. An operator retrieves a desired micro image and projects it on the screen. The operator then confirms the projected image and then scans and reads the micro image with the line sensor.

In micro images frame images) in a microfilm in its elongated direction, positions in its width direction may deviate, or the sizes may not be uniform on the microfilm due to photographic errors and the like.

Accordingly, with conventional micro-scanners, an operator has made positional adjustment of microfilm to locate a projected position of a micro image at a center position on the screen, or has made adjustment of projecting magnification to form a projected image with appropriate size. Then, after performing the adjustment, the micro image is read by using a line sensor.

Recently, however, with development in automation in offices, there is a demand of reading micro images by remote operation. In such a case, in place of positional adjustment of microfilm and adjustment of projecting magnification made by an operator, variations of photograph positions of micro images, variations of image sizes and the like must be automatically corrected. That is, without such correction, a line sensor reads a frame image with its part being out of its reading area, resulting in lack of part of the frame image in a read image.

FIG. 14 is a schematic diagram illustrating positional relationship between a CCD line sensor 140 and a projected image projected on the CCD line sensor 140, and image information read in respective conditions (1) and (2). Normally, as shown in FIG. 14, the length 140a of pixel line of CCD line sensor 140 is set to approximately the same extent as the width of the projected image of frame image I projected on the sensor. Accordingly, if the frame image I is formed at approximately center of the microfilm 141 with an appropriate size and without inclination, the width of frame image I approximately coincides; with the reading area 140a in a main scanning direction (the direction of arrangement of pixels) of CCD line sensor 140. If the frame image I is projected without any positional deviation in the main scanning direction with respect to line sensor 140, line sensor 140 can precisely read the entire image as to the frame image I.

However, for example, due to deviation of image position on microfilm 141, positional deviation in the main scanning direction when projecting an inclined image while rotating the image by skew correction, or positional deviation resulting from adjustment error between a film carrier and line sensor 140, frame image I may not coincide with reading area 140a of CCD line sensor 140 in the width direction (the main scanning direction) as shown in FIG. 14 (1) or (2) when projecting frame image I of microfilm 141. As a result, frame image I is read by CCD line sensor 140 with its part being lacking. $A_1$ and $A_2$ indicate lacking portions of read images.

Therefore, in conventional image-scanners, such problems have been solved by using the following methods.

That is to say, (1) as shown in FIG. 15, the magnification of a photographic lens is adjusted to low magnification in order to prevent lack of frame image I projected on CCD line sensor 140 when reading. Only a frame image portion is extracted from image data of read image IR and further the size of image is enlarged on the image data. Otherwise, (2) as shown in FIG. 16, using CCD line sensor 140 having a long reading width 140b in the main scanning direction, lack of projected frame image I in reading is prevented even if a position of frame image I deviates. Then, image data only of a frame image portion is extracted from image data of read image IR.

Correction about position and size of frame images have been made to remove no-image portions by either one of above-mentioned methods.

In such image scanners, shading correction has been made in order to correctly reproduce frame images. This is mainly for correcting illumination unevenness (optical unevenness caused by a light source and the like) of optical projecting system 13 of an image scanner, and unevenness of outputs of respective pixels (unevenness of outputs caused in a process of manufacturing CCD line sensor, for example) of CCD line sensor 11. For the shading correction, an image scanner is provided with a shading RAM, in which data for shading correction is stored. Then, the shading correction has been applied using the data for shading correction to a detected image signal.

In such conventional micro-scanners, however, the following problems have been occurring because of the above-described methods (1) and (2).

That is to say, according to the method (1), since a frame image is extracted from a read image and subjected to an enlarging operation, its resolution decreases. Also, according to the method (2), although the correction can be made without decreasing resolution, there has been a problem of an increased cost for manufacturing the entire scanner since it needs a CCD line sensor with a large size (having a large number of photoelectric conversion elements). Furthermore, there is also a problem that image data processings such as trimming is required.

SUMMARY OF THE INVENTION

Accordingly, it is an object of the present invention to prevent a decrease in resolution of a read image in an image reader using a line sensor with low cost.

It is another object of the present invention to efficiently perform reading of an original image using a line sensor with small size.

It is still another object of the present invention to reproduce precisely an image of original in an image reader using a line sensor.

It is yet another object of the present invention to decrease memory capacity storing data for shading correction in an image reader using a line sensor.

It is still another object of the present invention to appropriately apply shading correction, without increasing the number of photoelectric conversion elements in an image reader, and without decreasing resolution of a read image.

In an image reader according to the present invention, when the entire area of an image cannot be read due to deviation of positional relation between the image to be read and a line sensor, the quantity of deviation is detected in advance. The positional relation of the line sensor and the image is adjusted to remove the deviation. Accordingly, even by using a line sensor having a short extent of length of one side for an image, the entire region of image can be read. Since there is no need of enlarging an image taking the deviation into consideration as in conventional cases, the resolution of image is not decreased. As a result, in an image reader using a line sensor with low cost, the resolution of read image is not reduced.

In another aspect of the present invention, in an image reader, an image is read using a line sensor having a plurality of photoelectric converse on elements arranged in a main scanning direction. The photoelectric conversion elements have output unevenness. The image is projected on the line sensor through an optical system. The optical system also has illumination unevenness. When the line sensor is moved in a subscanning direction intersecting the main scanning direction and an image is projected, the output unevenness of the photoelectric conversion elements and the illumination deviation of the optical system are simultaneously sampled. Using the sampling data, shading correction is applied to the read image and the image is reproduced, so that the image of original is precisely reproduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flow chart for describing operation of the image reader according to the first embodiment of the present invention.

FIG. 8 is a schematic diagram illustrating arrangement relation of a projected image and a line sensor similar to FIG. 4 according to the third embodiment of the present invention.

FIGS. 14 to 16 are schematic diagrams illustrating original images projected by this kind of image reader, CCD line sensor and a read image.

FIG. 33 is a flow chart illustrating a program of a CPU when performing shading correction in main scanning with the microfilm scanner according to the ninth embodiment of the present invention.

DESCRIPTION OF THE PREFERRED EMBODIMENTS

(1) First Embodiment

Embodiments of the present invention will be described referring to the figures. FIGS. 1 through 4 are for describing the first embodiment of an image reader according to the present invention.

Figure 1:
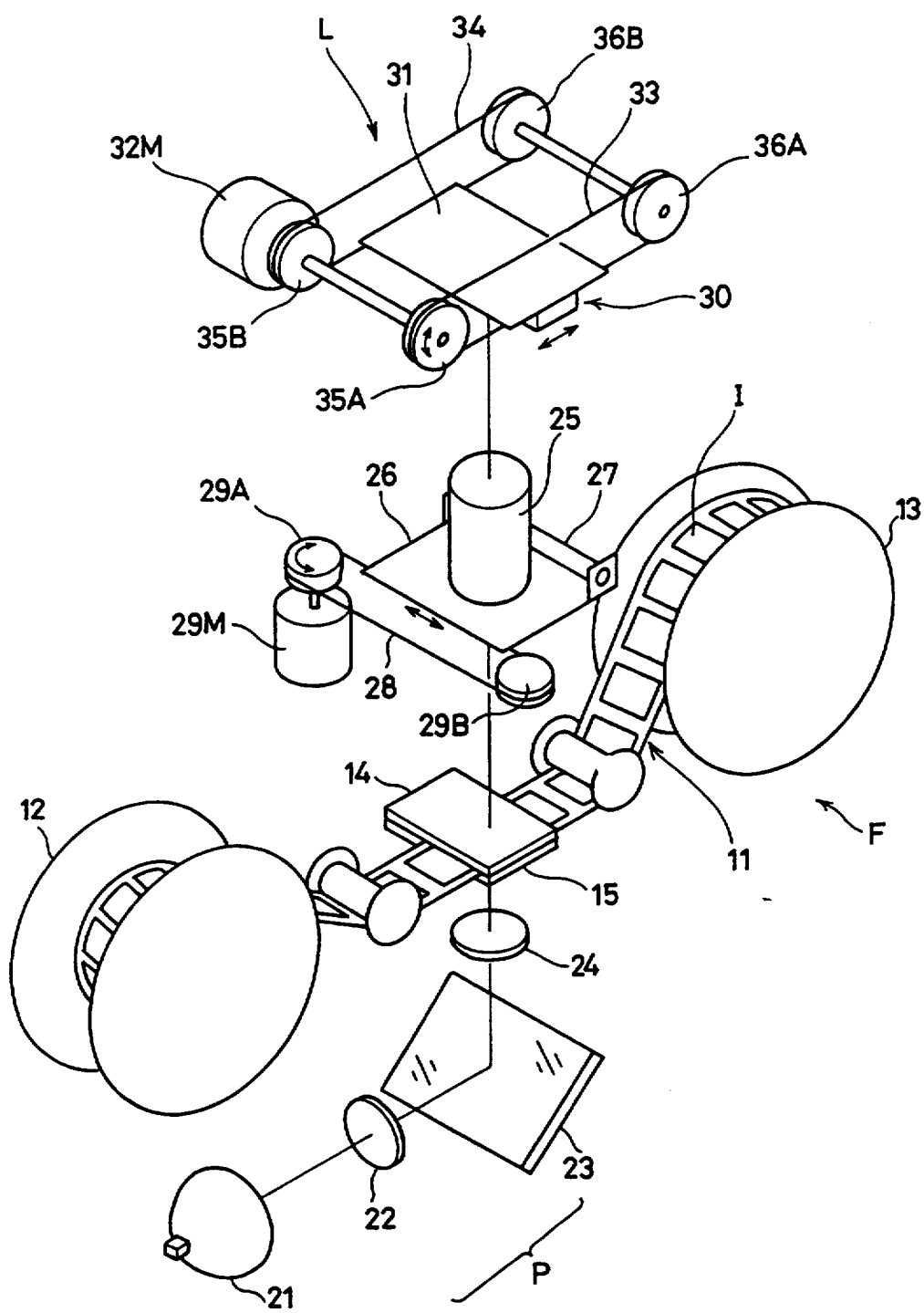
FIG. 1 is a perspective view illustrating schematic structure of an image reader according to the first embodiment of the present invention.

Referring to FIG. 1, the image reader according to this invention includes a film carrier F, an optical projecting system P and a line sensor mechanism L for reading frame images I of microfilm 11. Film carrier F includes a supply reel 12 and a take-up reel 13 over which microfilm 11 is put and a pair of upper glass 14 and lower glass 15 for sandwiching microfilm 11 in a vertical direction and fixing it at a leading position.

A plurality of frame images I are formed in the elongated direction on the surface of zonal microfilm 11. Two ends of microfilm 11 are wound around reels 12 and 13 which can rotate in normal and reverse directions, where microfilm 11 is driven by a motor (not shown) between these reels 12 and 13. By driving reels 12 and 13 with the motor, microfilm 11 can be taken up and rewound to retrieve any frame image I. Microfilm 11 is sandwiched between two transparent upper glass 14 and lower glass 15 at an approximate intermediate position between these two reels 12 and 13, which position is a reading position of frame images I.

The optical projecting system P includes a lamp 21 which is a light source, a condenser lens 22, a mirror 23, a condenser lens 24 and a projection lens 25. Light emitted from lamp 21 is condensed at condenser lens 22 and then reflected by mirror 23. The light reflected by mirror 23 is further condensed at condenser lens 24 and then passes through two glasses 14 and 15, and projection lens 25 and focuses on CCD line sensor 30. Accordingly, a frame image I in microfilm 11 is projected onto CCD line sensor 30. The CCD line sensor 30 outputs electric signals with values corresponding to intensity of projection light.

Projection lens 25 makes the light passing through projection lens 25 focus upon photoelectric conversion elements of CCD line sensor 30. The projection lens 25 can move in a main scanning direction which is perpendicular to the running direction of microfilm 11 (the sub scanning direction). That is to say, projection lens 25 is provided on a carrier plate 26 which is a rectangular plate held horizontally, and one end of carrier plate 26 is slidably engaging with a cylindrical slide rail 27. Carrier plate 26 can move in the main scanning direction along the slide rail 27. At the other end of carrier plate 26, both ends of wire 28 are engaged, respectively. Wire 28 is wound around two pulleys 29A and 29B with tension. Pulleys 29A and 29B are pivotable, respectively, and one pulley 29A is fixed to a drive axis of a drive motor 29M. The rotation of drive axis of drive motor 29M is transformed into reciprocating movement of carrier plate 26 along the main scanning direction through pulleys 29A and 29B and wire 28.

Line sensor mechanism L includes a CCD line sensor 30, a carrier plate 31 and a drive motor 32M. CCD line sensor 30 can move in the sub scanning direction. In CCD line sensor 30, a plurality (5000) of photoelectric conversion elements (hereinafter also referred to as pixels) are arranged on a line, which outputs electric signals having values which change corresponding to intensity of light received by respective photoelectric conversion elements. The CCD line sensor 30 is fixed to the lower surface of carrier plate 31 which is a rectangular plate.

opposite ends of carrier plate 31 in the main scanning direction are held by wires 33 and 34, respectively. These wires 33 and 34 form loops, respectively, and are wound around pulleys 35A, 35B and 36A, 36B rotatably supported by the same axis, respectively. That is, wire 33 is wound around pulleys 35A and 36A and wire 34 is wound around pulleys 35B and 36B. Also, these pulleys 35A and 35B are fixed to a drive axis of drive motor 32M. The rotation of drive axis of drive motor 32M is transformed into reciprocating movement of carrier plate 31 along the sub scanning direction through pulleys 35A, 35B and wires 33, 34.

Figure 2:
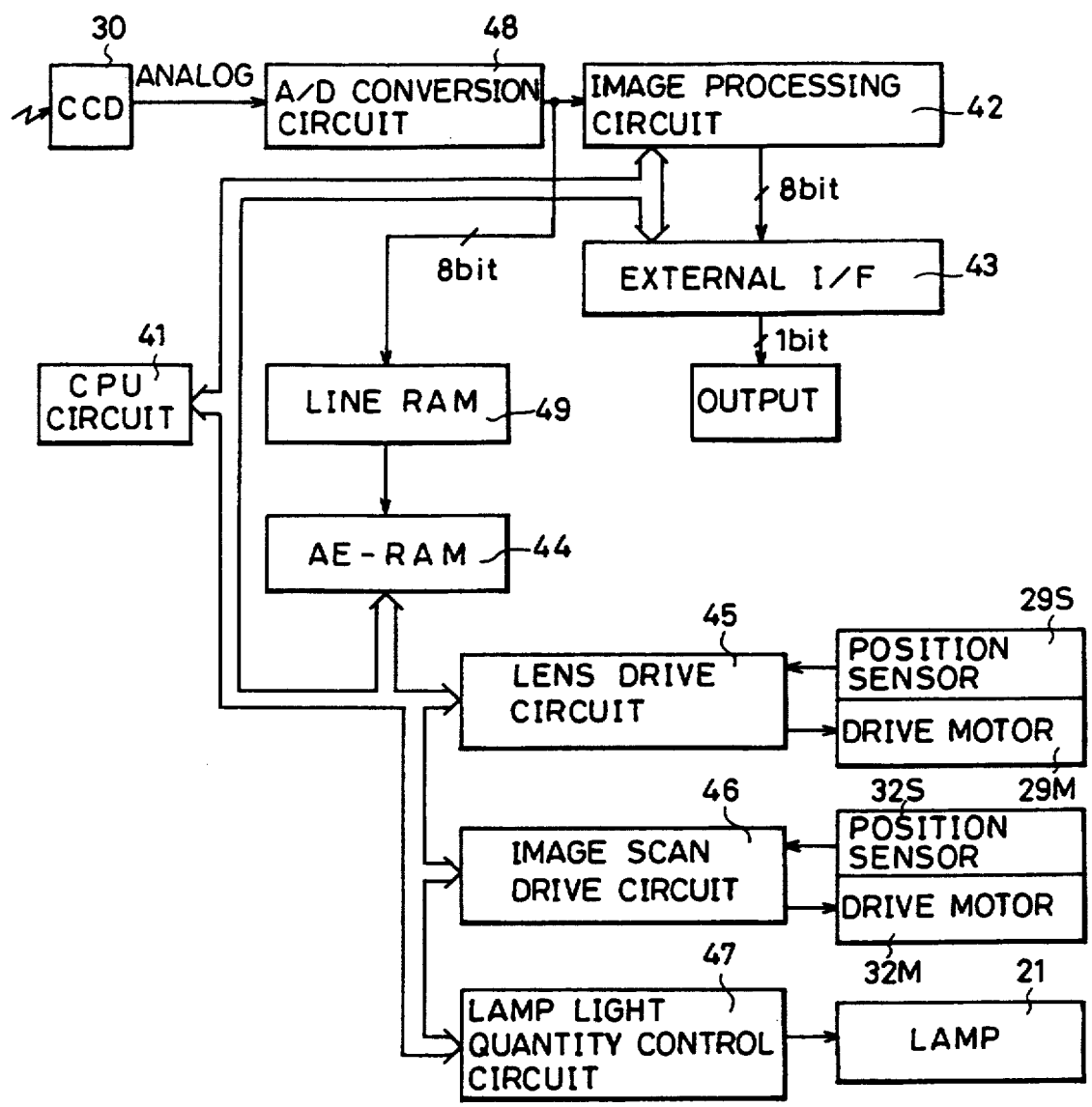
FIG. 2 is a block diagram illustrating a CPU of the image reader and peripheral circuits thereof according to the first embodiment of the present invention.
Figure 4A:
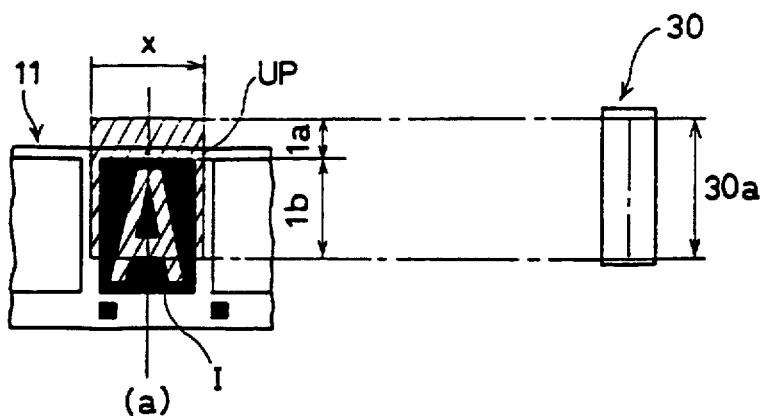
FIG. 4 is a schematic diagram illustrating a frame image projected by the image reader and a CCD line sensor and a read image according to the first embodiment of the present invention.
Figure 4B:
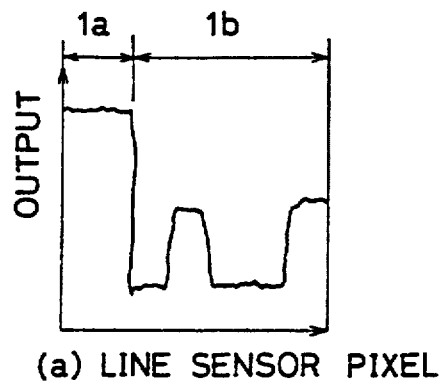
Figure 4C:
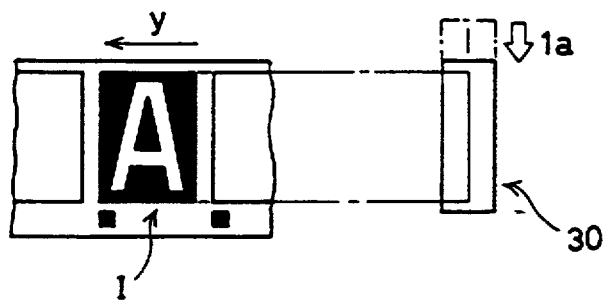
Figure 4D:
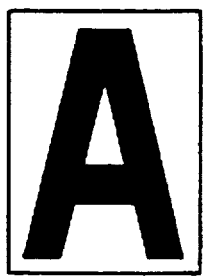

FIG. 2 is a block diagram illustrating a CPU circuit of the image reader and peripheral devices thereof according to this embodiment.

CPU circuit 41 includes a microprocessor, a RAM, a ROM, an I/O controller and the like. CPU circuit 41 is connected through a system bus to an image processing circuit 42, an external I/F (interface) circuit 43, an AE-RAM 44, a lens drive circuit 45, an image scan drive circuit 46 and a lamp light quantity control circuit 47, respectively. CPU circuit 41 controls operations in these circuits. Functions of respective portions will be described below.

A signal outputted by CCD line sensor 30 is amplified, passes through a low pass filter and is then converted into a digital signal by an A/D conversion circuit 48. The digital signal is inputted into image processing circuit 42 and subjected to processes such as filtering. The 8-bit digital signal outputted by image processing circuit 42 is converted into a 1-bit binary image signal in external I/F circuit 43 and provided out of the image reader.

In the preliminary scanning performed prior to main scanning for reading image, in the digital signals outputted by A/D conversion circuit 48, data corresponding to one line of CCD line sensor 30 is held in line RAM 49. During the preliminary scanning, CCD line sensor 30 moves in the sub scanning direction with respect to a projected image of frame image I, and when CCD line sensor 30 reads the next 1 line and its output signal is converted into a digital signal, data of the digital signal is held in line RAM 49. Accordingly, the data sampled in line RAM 49 are updated one after another.

In 1 line of data stored in line RAM 49, a part, or all of the data are transferred to AE-RAM 44. The data transfer may be performed for one line of data in several lines of data. The data stored in AE-RAM 44 is sequentially read into CPU circuit 41 and CPU circuit 41 determines position, size, and the like of the projected frame image I. Thus, when position and size of projected image are determined, CPU circuit 41 calculates a most appropriate position of projection lens 25. The most appropriate position is a position where a range in the main scanning direction of a frame image I projected onto CCD line sensor coincides with the reading range of CCD line sensor 30.

A drive motor 29M having a position sensor 29S is connected to lens drive circuit 45. Lens drive circuit 45 moves projection lens 25 to an initial position (e.g., a position where an optical axis of projection lens 25 coincides with a center of CCD line sensor 30) with an indication from CPU circuit 41 before starting scanning. Subsequently, CCD line sensor 30 moves in the sub scanning direction to perform preliminary scanning and the most appropriate position of projection lens 25 is calculated by CPU circuit 41. According to the calculated result, carrier plate 26 is moved. As a result, projection lens 25 fixed to carrier plate 26 is set to the specified most appropriate position in the main scanning direction.

A drive motor 32M is connected to image scan drive circuit 46, and the drive motor 32M also has a position sensor 32S. The image scan drive circuit 46 drives drive motor 32M when movement in the sub scanning direction is indicated. Position sensor 32S detects the number of rotations of drive motor 32M and outputs a signal representing a quantity of movement corresponding to the detected number of rotation to image scan drive circuit 46. Image scan drive circuit 46 receives the signal corresponding to the quantity of movement from position sensor 32S, and then compares it with the quantity of movement indicated by CPU circuit 41. If they coincide with each other, it stops drive of drive motor 32M. Accordingly, the quantity of movement in the sub scanning direction of CCD line sensor is set to a quantity of movement specified in CPU circuit 41. CCD line sensor 30 is thus moved in the sub scanning direction to realize scanning of frame images I.

The lamp 21 is connected to lamp light quantity control circuit 47. Lamp light quantity control circuit 47 receives an indication from CPU circuit 41 to adjust quantity of exposure by controlling voltage applied to lamp 21.

FIG. 3 is a flow chart for describing operation of the image reader according to the first embodiment.

Microfilm 11 is attached to film carrier F and an operator starts operation of the image reader. Then, by a known method, image retrieval is performed and a frame image I to be read is set to a reading position between upper glass 14 and lower glass 15. Then, CPU circuit 41 gives indication to lens drive circuit 45 to set position of projection lens 25 to a predetermined above-described initial position (S301).

Also, CCD line sensor 30 is set to a preliminary scan start position (S302).

Next, lamp light quantity control circuit 47 receives indication from CPU circuit 41 and lights lamp 21 (S303). As a result, a frame image I of microfilm 11 is projected on CCD line sensor 30. Then, a determination is made as to whether the operations of S301-S303 have been finished or not by a position sensor (S304), for example, and if the preparation has been made (the answer of the determination is YES), the next step S305 is carried out. If the preparation of preliminary scanning is not finished (the answer of determination is NO), the determination of step S304 is continuously carried out until the preparation is finished.

Then, in step S305, the preliminary scanning starts. (A) and (C) shown in FIG. 4 are schematic diagrams illustrating positional relationship in the main scanning direction between CCD line sensor 30 and a projected image projected on the sensor. In the example shown in FIG. 4 (A), not only frame image I but also an upper frame portion UP of microfilm 11 is projected on CCD line sensor 30 at the initial position. By driving drive motor 32M by image scan drive circuit 46, CCD line sensor 30 moves at a constant speed along the sub scanning direction from the scan starting position and starts reading the projected frame image I (S305). A signal outputted from CCD line sensor 30 is converted into a digital signal by A/D conversion circuit 48 and data corresponding to 1 line is written into line RAM 49 (S306). Then, part of or whole the data written into line RAM 49 is transferred to AE-RAM 44 (S307).

Furthermore, CCD line sensor 30 moves by a distance corresponding to one frame of microfilm 11 in the sub scanning direction (the x direction in FIG. 4 (A)) and a determination is made as to whether the preliminary scanning has been finished or not (S308). If the preliminary scanning has not been finished (the result of determination in S308 is NO), operations of S306 and S307 are continuously carried out until the preliminary scanning is finished. If the preliminary scanning has been finished (the result of determination in S308 is YES), the next step S309 is carried out.

That is, on the basis of image data transferred to AE-RAM 44, CPU circuit 41 detects the length $1a$ of the projected upper frame portion UP and portion out of the frame (S309). An output of each photoelectric conversion element (pixel) by CCD line sensor 30 at the position (a) in FIG. 4 (A) is shown in the graph of the figure (B). Thus, since negative film is used as microfilm 11, values of output of an upper frame portion and a portion out of the frame are larger than those in other read portions. The length $1a$ is calculated on the basis of the output. $1b$ represents length of the read frame image I portion.

Then, a quantity of movement $1a$ in the main scanning direction of projection lens 25 is determined by the length $1a$ of the frame portion detected in step S309 (S310). CPU circuit 41 moves projection lens 25 in the main scanning direction with lens drive circuit 45 so that a projected image moves in the main scanning direction by $1a$ with CCD line sensor 30 according to the quantity of movement (S311). As a result, CCD line sensor 30 and the projected image are set in the positional relationship shown in FIG. 4 (C).

Next, CPU circuit 41 makes a determination as to whether preparation for main scanning has been finished or not (S312), and if the preparation has been finished (YES in S312), the next step S313 is carried out. If the preparation has not been finished (NO in S312), a determination of S312 is continuously made until the preparation is finished while making error display, for example.

CCD line sensor 30 then starts moving at a constant speed in the sub scanning direction y from the scanning starting position in the direction reverse to the operation of the preliminary scanning to read frame image I projected on CCD line sensor 30 (S313). A signal outputted from CCD line sensor 30 is converted into a digital signal by A/D conversion circuit 48 and then outputted to external devices and the like through image processing circuit 42 and external I/F circuit 43 (S314). For example, CCD line sensor 30, disposed in the positional relationship shown in FIG. 4 (C), reads frame image I using the entire reading area 30a. As a result, an image as shown in the figure (D) can be obtained without lacking and without requirement of trimming processing or the like.

Then, a determination is made as to whether scanning has been finished or not (S315), and if scanning has not been finished (NO in S315), operations of S313 and S314 are continuously carried out until scanning is finished. If the scanning has been finished (YES in S315), lamp light quantity control circuit 30 puts out lamp 21 (S316), and operation of the image reader finishes.

According to the image reader by the present embodiment, as to a frame image I projected on CCD line sensor 30, a position in the main scanning direction of the projected frame image I is corrected without manual operation by an operator so that it approximately coincides with reading area 30a of CCD line sensor. Also, a decrease in resolution for the read original can be prevented.

(2) Second Embodiment

Figure 5:
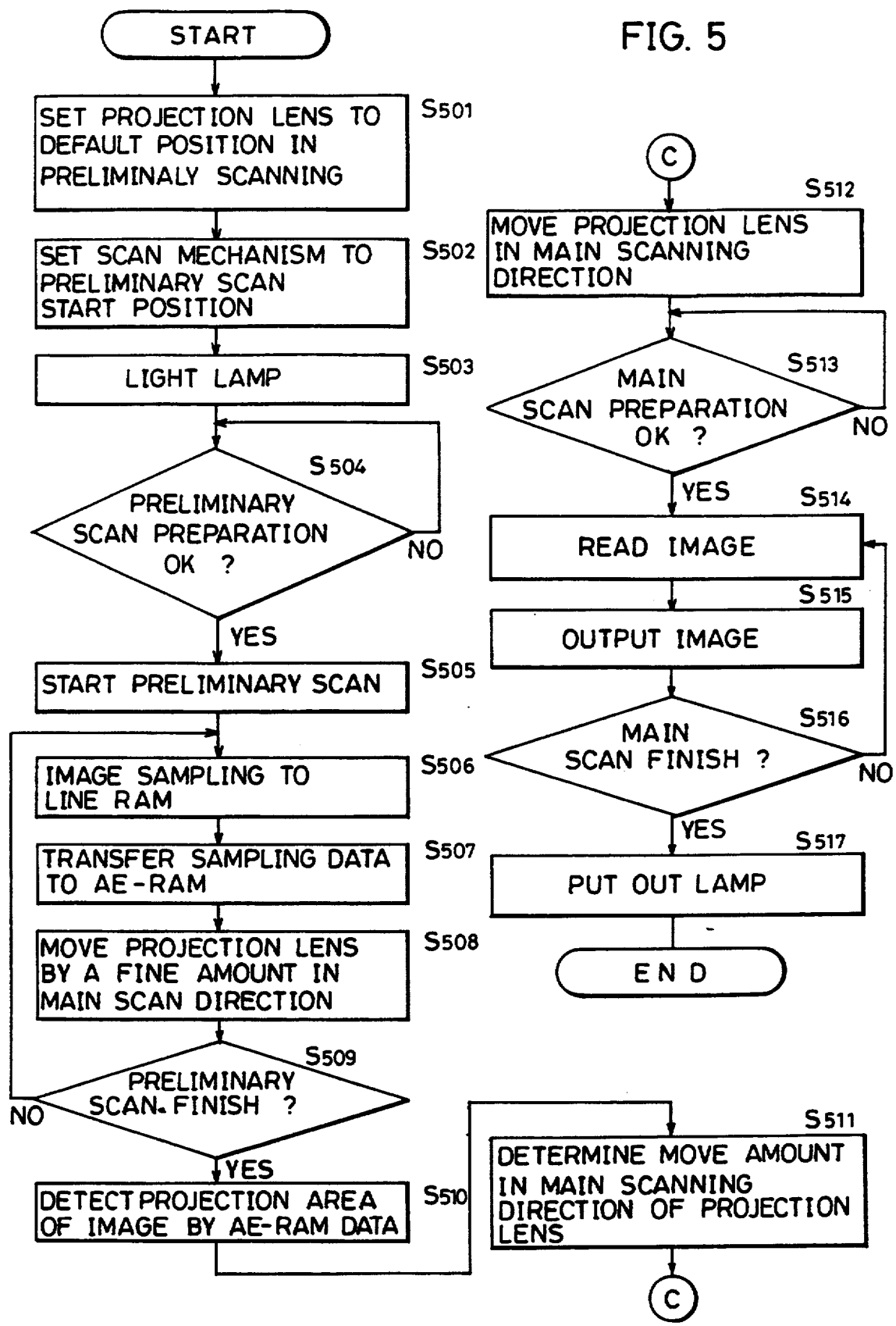
FIG. 5 is a flow chart for describing operation of an image reader according to the second embodiment of the present invention.
Figure 6A:
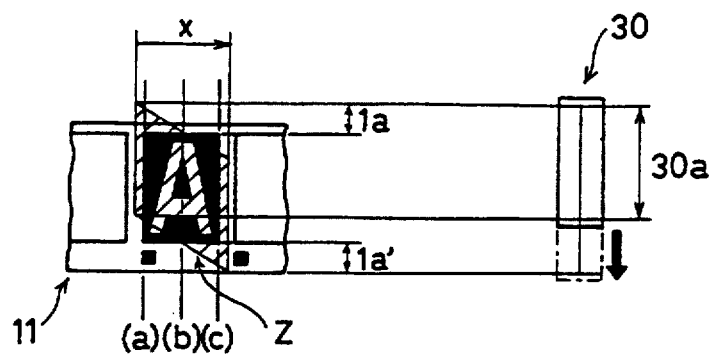
FIG. 6 is a schematic diagram illustrating relationship between a projected image and a line sensor similar to FIG. 4 according to the second embodiment of the present invention.
Figure 6B:
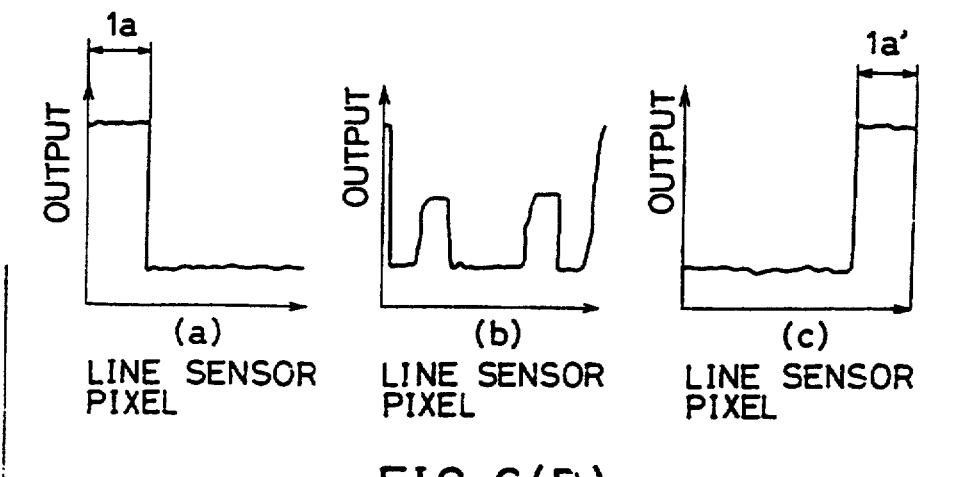
Figure 6C:
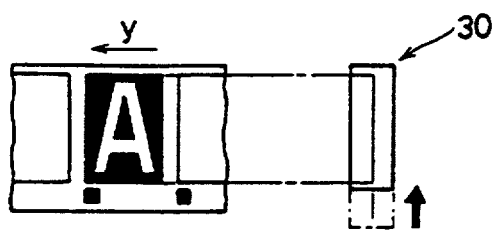
Figure 6D:

FIG. 5 is a flow chart for describing the second embodiment of an image reader according to the present invention, and FIG. 6 is a diagram for describing operation, output signals and the like of a projected image and a CCD line sensor 30 of the second embodiment. In this embodiment, the device configuration is the same as that in the first embodiment, and description thereof is not repeated. However, the method of preliminary scanning is different from that in the first embodiment, and description is given only on the different portion.

That is, steps S501 through S505 of the flow chart shown in FIG. 5 are the same as those in the above-described embodiment, and when CCD line sensor 30 disposed at the initial position of FIG. 6 moves in the sub scanning direction x, projection lens 25 is also moved in the main scanning direction by steps of fine quantities simultaneously. By doing so, as shown by a lozenge z in FIG. 6 (A), preliminary scanning is applied to frame image I to detect lengths 1a, 1a' of upper and lower frames and portions with no image out of frame image I.

Specifically, after starting preliminary scanning, after sampling image data to line RAM 49 (S506) and transferring the sampling data to AE-RAM 44 (S507), step S508 for driving projection lens 25 with its drive motor 29M to move it by a fine amount in the main scanning direction is added, and steps S506, S507, S508 are continuously conducted until the preliminary scanning is finished. For example, as an output of CCD line sensor 30 is shown in the graph of FIG. 6 (B), the length 1a of the upper frame and a portion out of frame is detected at the position (a), and only frame image I is detected at (b), and the length 1a' of the lower frame and a portion out of the frame is detected at the position (c). By such detection in the full width direction of microfilm 11, the frame image I position can be detected more precisely.

In negative film, for example, the boundary of a frame portion and a blank space portion in an image may be vague, but it can be corrected by detecting the upper and lower frames even if an error occurs in the initial reading, for example, so that positions of CCD line sensor 30 and its projected image in the main scanning direction can always be matched with each other in an appropriate condition. It removes possibility of wrong determination about position.

In the second embodiment, similarly to the first embodiment, as shown in FIG. 6 (C), projection lens 25 is moved in the main scanning direction in main scanning to make projected frame image I coincide with reading area 30a of CCD line sensor 30 and CCD line sensor 30 is moved in the sub scanning direction y to read the image (S510–S517). FIG. 6 (D) shows a read image.

(3) Third Embodiment

Figure 7:
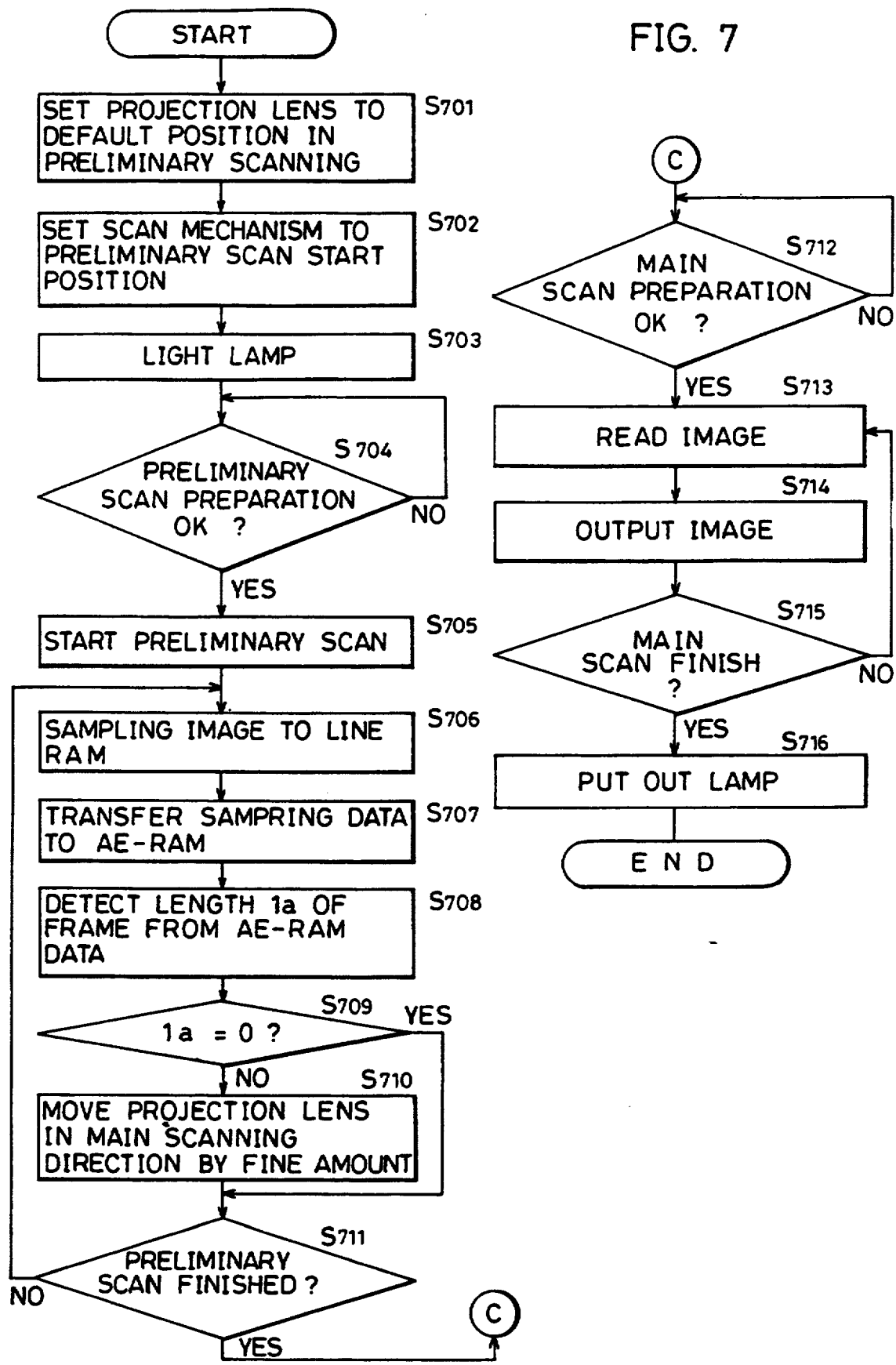
FIG. 7 is a flow chart for describing operation of an image reader according to the third embodiment of the present invention.

FIGS. 7 and 8 show the third embodiment of the present invention. Only specific features will be described in this embodiment similarly to the second embodiment. The device structure is the same as that of the first and second embodiments, and operation by CPU circuit 41 is also similar to the second embodiment.

In this third embodiment, in preliminary scanning, when there is not output by CCD line sensor 30 corresponding to the upper frame and a portion out of the frame, movement of projection lens 25 in the main scanning direction with respect to CCD line sensor 30 is stopped. As a result, preliminary scanning can be performed at a higher speed in a shorter time than the second embodiment.

That is to say, on the basis of a high output designating a frame or a portion out of the frame, the length 1a is detected in preliminary scanning (S708), and check is made as to whether the length 1a becomes 0 or not (S709). For example, as shown in the graph of FIG. 8 (B), the length 1a becomes 0 at the position (b). Accordingly, projection lens 25 is continuously moved by a fine amount in the main scanning direction until it attains 0 (S710), and when it attains 0, the movement of projection lens 25 is not carried out.

(4) Fourth Embodiment

Furthermore, FIGS. 9 through 13 are for describing the fourth embodiment of the present invention. In this embodiment, when frame image I in microfilm 11 is inclined, the inclination correction (skew correction) and correction of positional deviation in the main scanning direction are performed.

Figure 9:
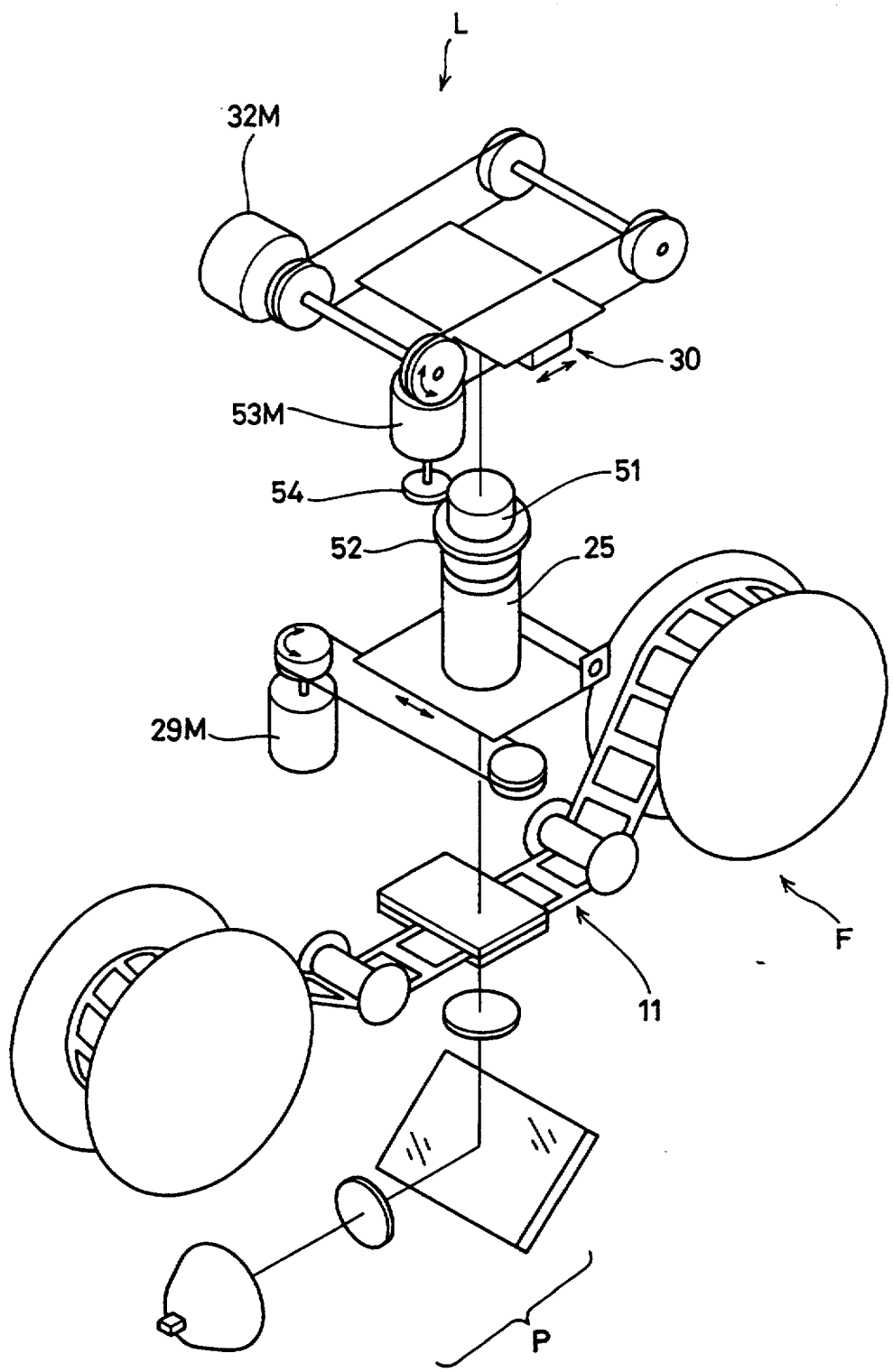
FIG. 9 is a perspective view of an image reader according to the fourth embodiment of the present invention.
Figure 10:
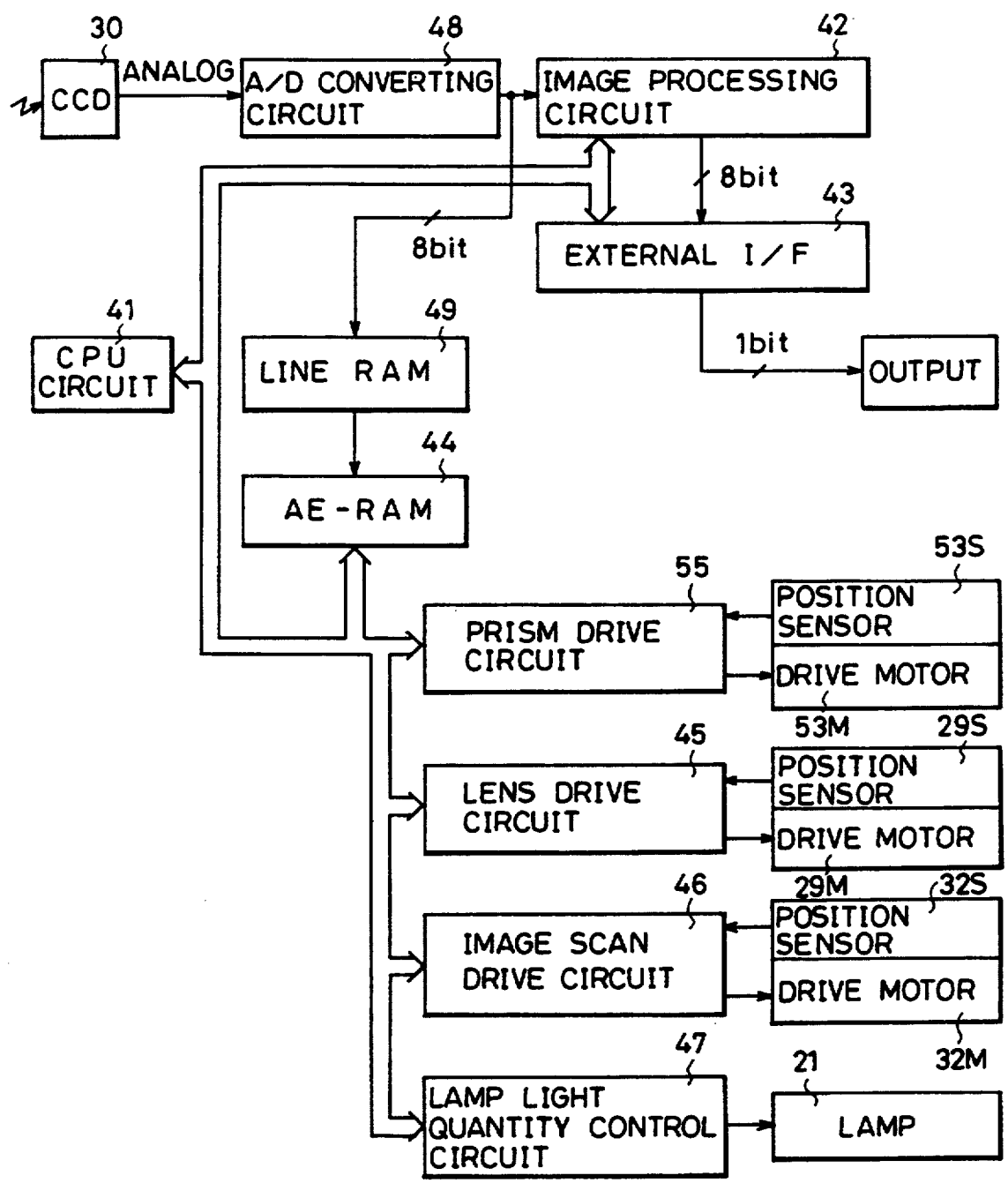
FIG. 10 is a block diagram illustrating schematic structure of a CPU circuit of the image reader according to the fourth embodiment of the present invention.
Figure 11:
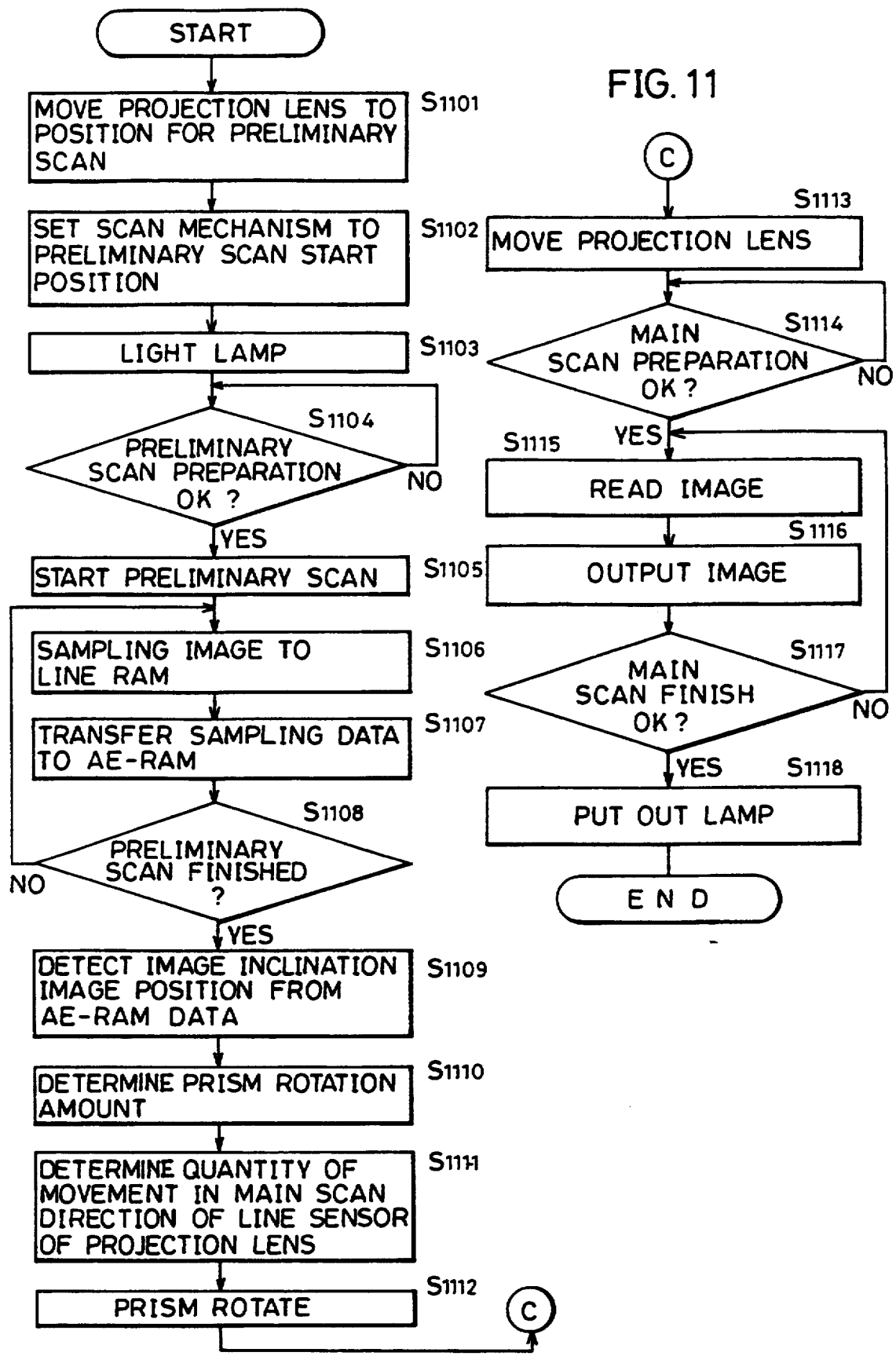
FIG. 11 is a flow chart illustrating operation of the image reader according to the fourth embodiment of the present invention.

That is to say, as shown in FIG. 9, a prism 51 and a driving mechanism thereof are added to the image reader shown in FIG. 1. The prism 51 is provided on an optical axis between projection lens 25 and CCD line sensor 30. The prism 51 has a function of rotating an original image (frame image I) projected onto CCD line sensor 30 about the optical axis. A gear 52 is attached to a part of member constituting prism 51, which is meshed with a gear 54 affixed to an output axis of drive motor 53M, and prism 51 is rotated using driving force of drive motor 53M. Then, the rotation angle of prism 51 is detected by position sensor 53S, and drive motor 53M is driven and controlled by a prism drive circuit 55. Accordingly, the rotation angle of a projected image by prism 51 can be arbitrarily set through prism drive circuit 55, drive motor 53M by CPU circuit 41. Also, prism 51 and drive motor 53M have configurations capable of moving in the main scanning direction together with the projection lens 25. Accordingly, prism 51 constitutes a part of optical projection system P.

In the operation of the image reader according to the fourth embodiment, detecting inclination of frame image I before scanning, calculating a quantity of rotation of prism on the basis of the same, and rotating prism 51 are added to operation of the first embodiment shown in FIG. 3.

That is to say, inclination of an original image with respect to the sub scanning direction and image position are detected from data of AE-RAM 44 sampled in the preliminary scanning (S1109). According to the angle of inclination, a quantity of rotation of prism 51 is determined (S1110), and a quantity of movement in the main scanning direction of projection lens 25 is also determined similarly to above-described embodiment (S1111). Prism 51 is then rotated by the drive motor 53M by the quantity of rotation (S1112), and also projection lens 25 is moved in the main scanning direction (S1113). As a result, the inclination of frame image I with respect to the sub scanning direction is corrected and the positional deviation in the main scanning direction can also be corrected. Then, in this condition, CCD line sensor 30 reads frame image I by scanning and provides it as an output (S1114–S1118).

Figure 12A:
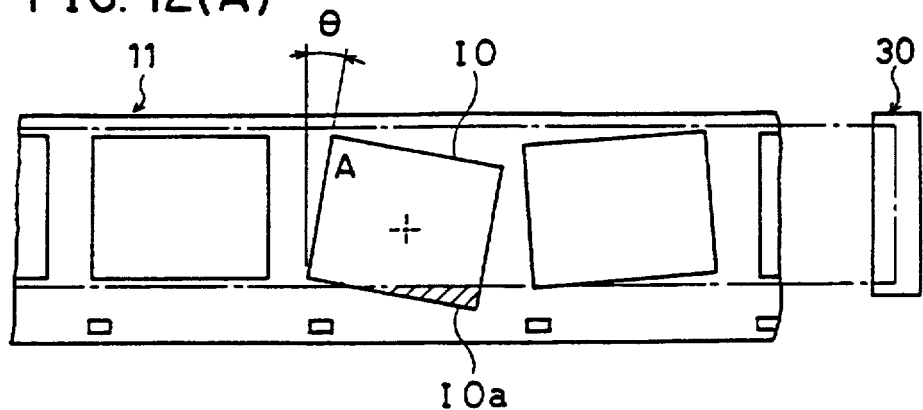
FIG. 12 is a schematic diagram for describing arrangement relation between a projected image of the image reader and a line sensor according to the fourth embodiment of the present invention.
Figure 12B:
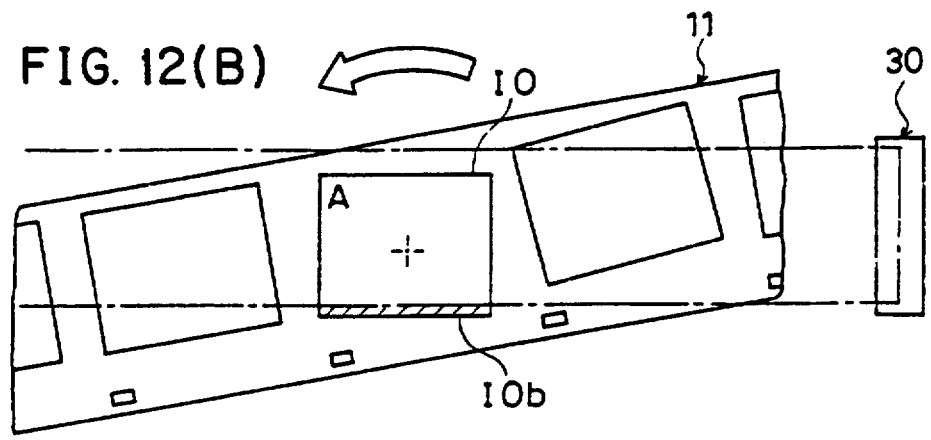
Figure 12C:
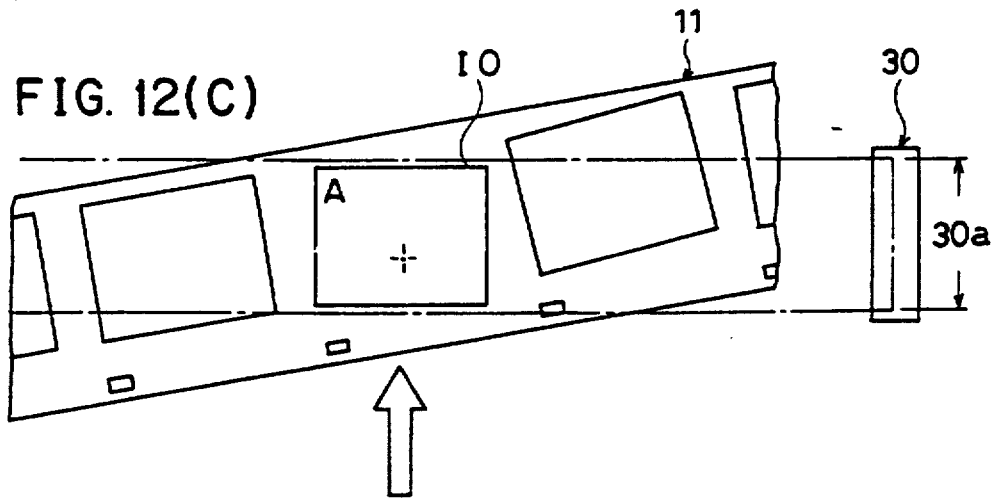

FIG. 12 is a diagram for giving description upon the above-noted inclination correction and movement correction in the main scanning direction in the case where one frame image I is inclined in microfilm 11 in which a plurality of frame images I are formed in order. That is, if frame image I0 is inclined by a predetermined angle $\theta$ with respect to a width direction of microfilm 11, CCD line sensor 30 cannot read a portion I0a designated by the oblique line in FIG. 12 (A). Accordingly, the angle $\theta$ is calculated on the basis of read data of preliminary scanning, and prism 51 is rotated. As a result, a projected frame image I0 is located with respect to CDD line sensor 30 as shown in the figure (B). Therefore, when CCD line sensor 30 scan the frame image I0 in this condition while moving relatively in the sub scanning direction, some portion will be lacking in reading (the oblique line portion I0b in the figure). Therefore, a quantity of movement in main scanning direction is also calculated and projection lens 25 is driven in order to make projected frame image I0 and reading area 30a of CCD line sensor 30 coincide with each other in the main scanning direction.

Accordingly, according to the embodiment, even if an original is inclined in microfilm 11, the inclination is corrected and positional deviation in the main scanning direction which might be caused due to the correction can also be completely corrected.

Figure 13A:
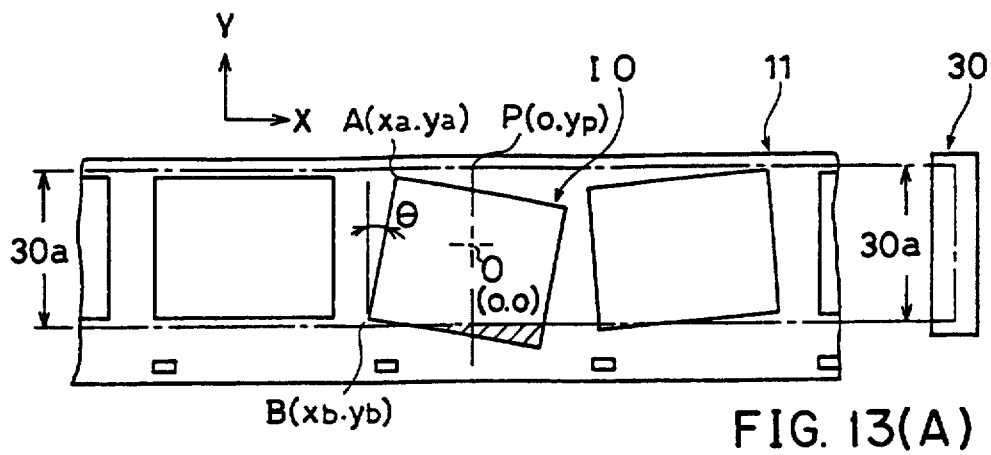
FIG. 13 is a schematic diagram for describing operation of the image reader according to the fourth embodiment of the present invention.
Figure 13B:
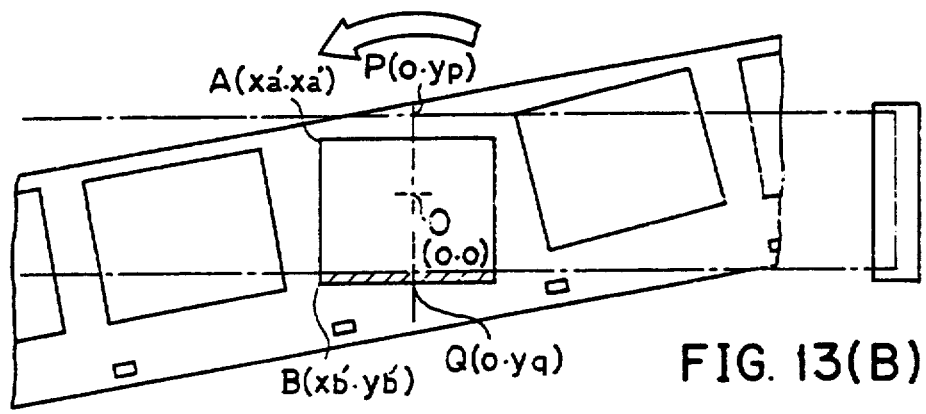
Figure 13C:
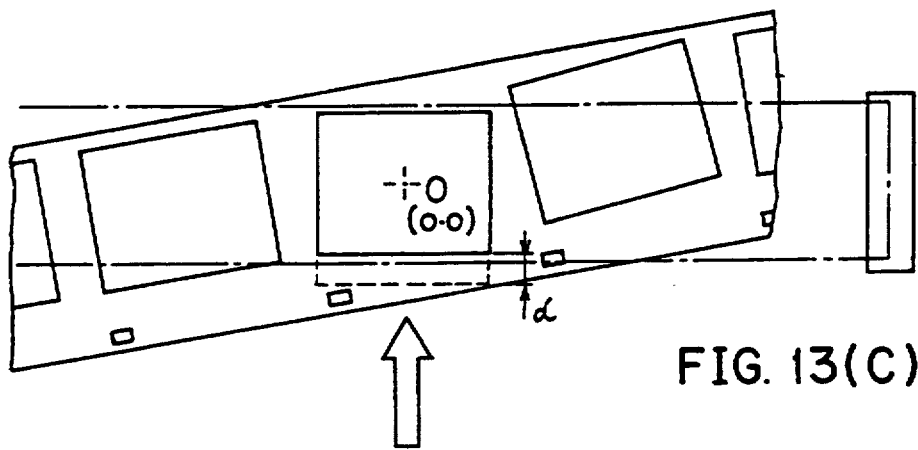
Figure 14A:
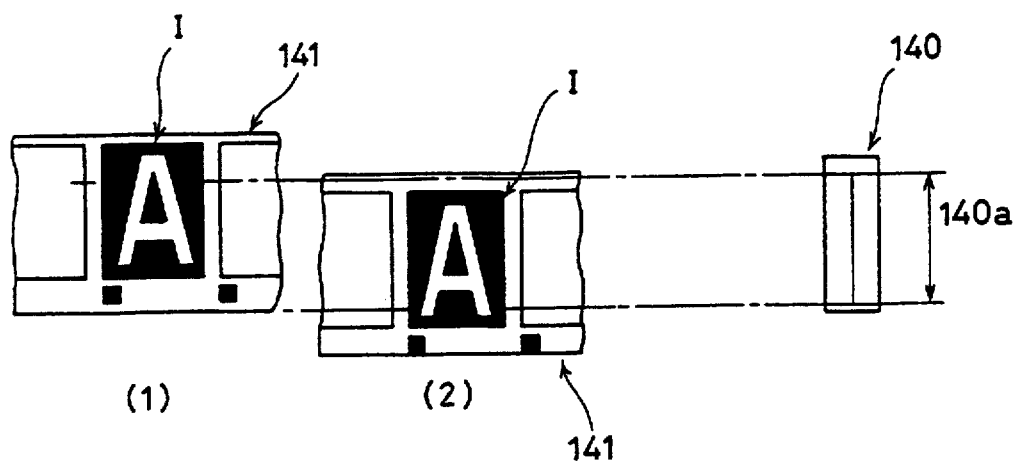
Figure 14B:
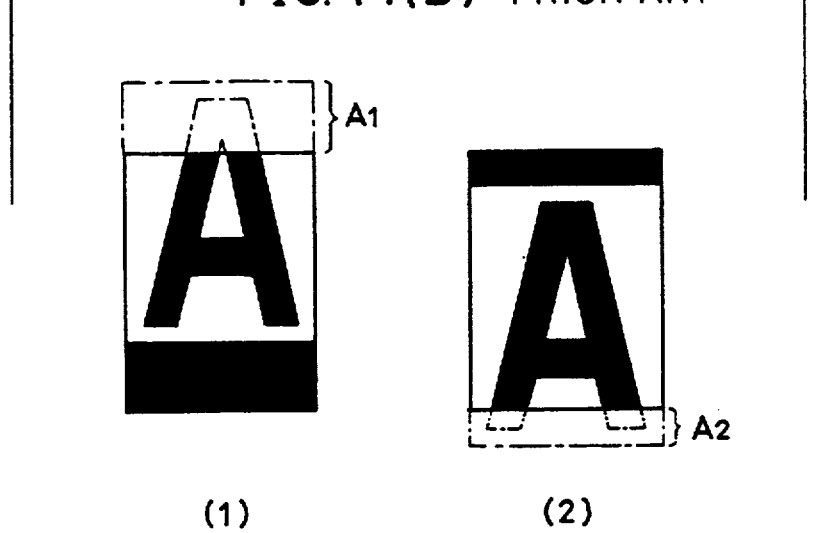

Furthermore, on the basis of FIG. 13, a method of simultaneously performing operations of a quantity of rotation for the above-identified inclination and a quantity of movement in the main scanning direction will be described. That is to say, let the rotational center of prism be an origin, and let the distances to the upper end P and the lower end Q of the reading area of CCD line sensor 30 from the origin be expressed as $y_p$ and $y_q$, respectively. In FIG. 13 (A), by detecting corner points A ($x_a$, $y_a$), B ($x_b$, $y_b$) of frame image I0, an inclination angle $\theta$ of frame image I0 is calculated. When frame image I0 is inclined by angle $\theta$, the inclination angle $\theta$ is corrected by prism 51 ((B) in FIG. 13). At this time, points A and B move to points A' and B', respectively. Let the coordinates of points A' and B' be ($x_a'$, $y_a'$), ($x_b'$, $y_b'$), respectively, and the following expression holds.

$$\begin{pmatrix} x_a' \\ y_a' \end{pmatrix} = \begin{pmatrix} \cos\theta & -\sin\theta \\ \sin\theta & \cos\theta \end{pmatrix} \begin{pmatrix} x_a \\ y_a \end{pmatrix}$$

$$\begin{pmatrix} x_b' \\ y_b' \end{pmatrix} = \begin{pmatrix} \cos\theta & -\sin\theta \\ \sin\theta & \cos\theta \end{pmatrix} \begin{pmatrix} x_b \\ y_b \end{pmatrix}$$

Comparing the y coordinates of points A' and B' with y coordinates of points P and Q, the deviation quantity z of frame image I0 is calculated. That is, the following expressions (1) and (2) are applied.

$$z_a = |y_a'| - |y_p| < 0 \text{ and, } z_b = |y_b'| - |y_q| < 0 \tag{1}$$

$$z_a = |y_a'| - |y_p| < 0 \text{ or, } z_b = |y_b'| - |y_q| < 0 \tag{2}$$

Accordingly, when the expression (1) holds, frame image I0 is within a reading area, and when the expression (2) holds, it is out of the reading area.

For example, if a part of frame image deviates as shown by FIG. 13 (B), the following expressions holds.

$$z_b = |y_b'| - |y_q| < 0 \tag{3}$$

A lacking portion of frame image is compensated for by moving projection lens 25. The quantity $\alpha$ of movement of projection lens 25 can be expressed in the following expression.

$$\alpha = \frac{|z_a| + |z_b|}{2} \tag{4}$$

The frame image is thus projected at a center of reading area 30a of CCC line sensor 30.

In the above-described embodiments, positional adjustment is made in the main scanning direction by moving an optical projection system, but microfilm may be moved by a film carrier, or the positional adjustment can be made by a line sensor. Although a projected image is rotated by rotation of the prism in the above-described embodiment, the line sensor may be rotated, or the microfilm may be rotated. Furthermore, either one of rotation of prism, i.e. skew correction, and movement of projection lens, i.e. correction of relative position in the main scanning direction of a projected image and a line sensor, may be performed first, or they can be performed simultaneously. Although skew correction is made by rotation of prism in the above-described embodiment, it can be made by rotating the CCD line sensor or the roll film carrier. Furthermore, in the above-described embodiments, sub scanning is performed by moving the CCD line sensor and positional correction in the main scanning direction of a projected image is made by moving projection lens 25, but both of them can be performed by moving any one in the optical system such as the CCD line sensor, the projection lens, the roll film carrier, the mirror. Furthermore, although a device for reading an image on microfilm has been illustrated in the above-described embodiments, the present invention can also be applied to common image readers in which light is radiated onto an image on paper and the reflected light is read by a CCD line sensor.

(5) Fifth Embodiment

Figure 17:
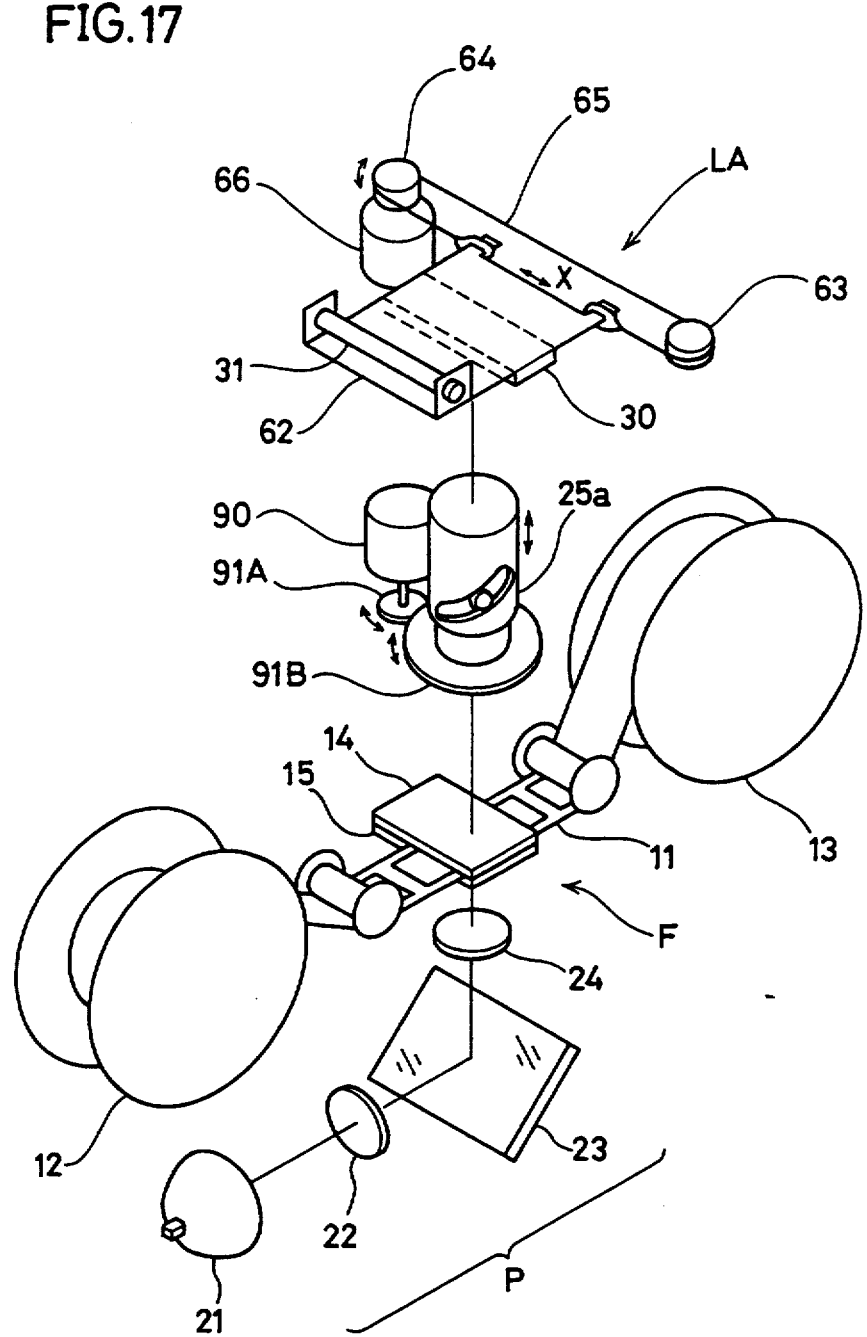
FIG. 17 is a perspective view illustrating schematic structure of an image reader according to the fifth embodiment of the present invention.

FIG. 17 is a schematic diagram illustrating configuration of an image reader according to the fifth embodiment. It is basically the same as FIG. 1 illustrated in the first embodiment except that projection lens 25a and CCD drive mechanism LA are different. Accordingly, the same characters are allotted to the same parts and description thereof is not repeated here.

A projection lens 25a focuses light passing through projection lens 25a at photoelectric conversion elements of CCD line sensor 30. The projection lens 25a includes a zoom lens having variable magnification. A drive motor 90 is provided in the vicinity of projection lens 25a and a gear 91A is fixed to a drive axis of the drive motor 90. Gear 91A meshes with gear 91B of projection lens 25a. With rotation of gear 91B, a part of lens in projection lens 25a moves along the optical axis direction. Accordingly, the rotation of drive axis of drive motor 90 becomes reciprocating movement along the optical axis direction of the lens 25a through gears 91A and 91B and its projection magnification changes.

Line sensor mechanism LA has a CCD line sensor 30, a carrier plate 62 and a drive motor 66, and CCD line sensor 30 is movable in the main scanning direction which is perpendicular to the sub scanning direction. CCD line sensor 30 includes a plurality (5000) of photoelectric conversion elements (hereinafter, also referred to as pixel) arranged on a line, and outputs electric signals having values variable corresponding to intensity of light received by respective photoelectric conversion elements. CCD line sensor 30 is suspended from and fixed to a lower surface of carrier plate 62 which is a rectangular plate.

One end of carrier plate 62 slidably engages with a cylindrical slide rail 31 and the carrier plate 62 can move in a direction of arrangement of photoelectric conversion elements of CCD line sensor 30 (the main scanning direction) along the slide rail 31. Accordingly, CCD line sensor 30 is movable in the main scanning direction together with carrier plate 62. Both ends of a wire 65 are engaged with the other end of carrier plate 62. Wire 65 is wound around two pulleys 64 and 65 with tension. Pulleys 64 and 65 are pivotable, respectively, and one pulley 64 is fixedly attached to a drive axis of drive motor 66. The rotation of drive axis of drive motor 66 is transformed into reciprocating movement of carrier plate 62 along the main scanning direction through pulleys 64 and 65 and wire 65. Accordingly, the position of CCD line sensor 30 with respect to a frame image projected onto CCD line sensor 30 can be adjusted in the main scanning direction. The relative movement in the main scanning direction of the projected image and CCD line sensor 30 may be performed by moving other optical systems such as projection lens 25a or film carrier F in the main scanning direction with CCD line sensor being fixed.

Figure 18:
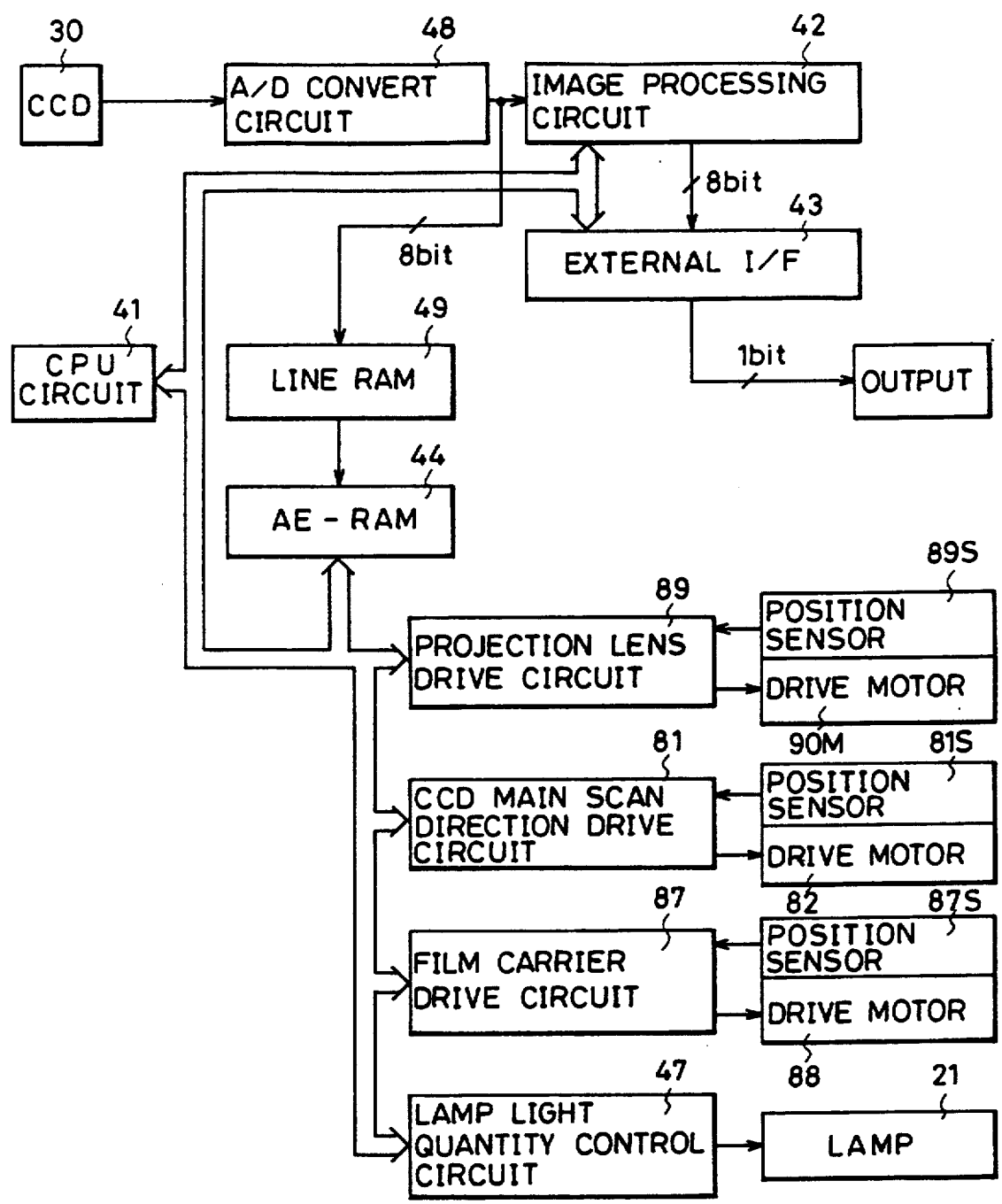
FIG. 18 is a block diagram illustrating a CPU of the image reader and peripheral circuits thereof according to the fifth embodiment of the present invention.

FIG. 18 is a block diagram illustrating a CPU circuit and peripheral devices of the image reader according to the fifth embodiment. It is almost the same as the first embodiment shown in FIG. 2, and the same characters are allotted to the same parts and description thereof is not repeated.

A CPU circuit 41 and a drive motor 90 having a position sensor 89 are connected to a projection lens drive circuit 89. Projection lens drive circuit 89, when receiving indication of magnification of projection lens 25a by CPU circuit 41, drives drive motor 90. Position sensor 89S detects rotation angle of drive motor 90 and outputs a signal representing magnification corresponding to the detected rotation angle to projection lens drive circuit 89. Projection lens drive circuit 89 receives a signal corresponding to the detected magnification from position sensor 89 and compares it with the magnification indicated by CPU circuit 41, and when they coincide with each other, stops drive of drive motor 90. Accordingly, the magnification of projection lens 25a is set to the magnification specified in CPU circuit 41.

A CPU circuit 41 and a drive motor 82 having a position sensor 81S are connected to CCD main scanning direction drive circuit 81. Similarly to the operation in projection lens drive circuit 89, CCD main scanning direction drive circuit 81 first moves CCD line sensor 30 to an initial position (for example, an arbitrary position in the main scanning direction where CCD line sensor 30 can read a frame image) before starting scanning. Subsequently, when CPU circuit 41 specifies to the motor an appropriate position of CCD line sensor in the main canning direction, motor 82 moves carrier plate 62 and CCD line sensor 30 fixed to carrier plate 62 is set to the specified most appropriate position. Motor 90, gears 91A and 91B, carrier plate 62, slide rail 31, wire 65, pulleys 64 and 65 and motor 66 constitute a drive mechanism of CCD line sensor together.

A CPU circuit 41 and a drive motor 90 having a position sensor 87 are connected to film carrier drive circuit 87. Film carrier drive circuit 87 receives indication of position of film carrier F from CPU circuit 41 and film carrier F sequentially moves microfilm 11 in the sub scanning direction to realize scanning of frame images by CCD line sensor 30.

Figure 19:
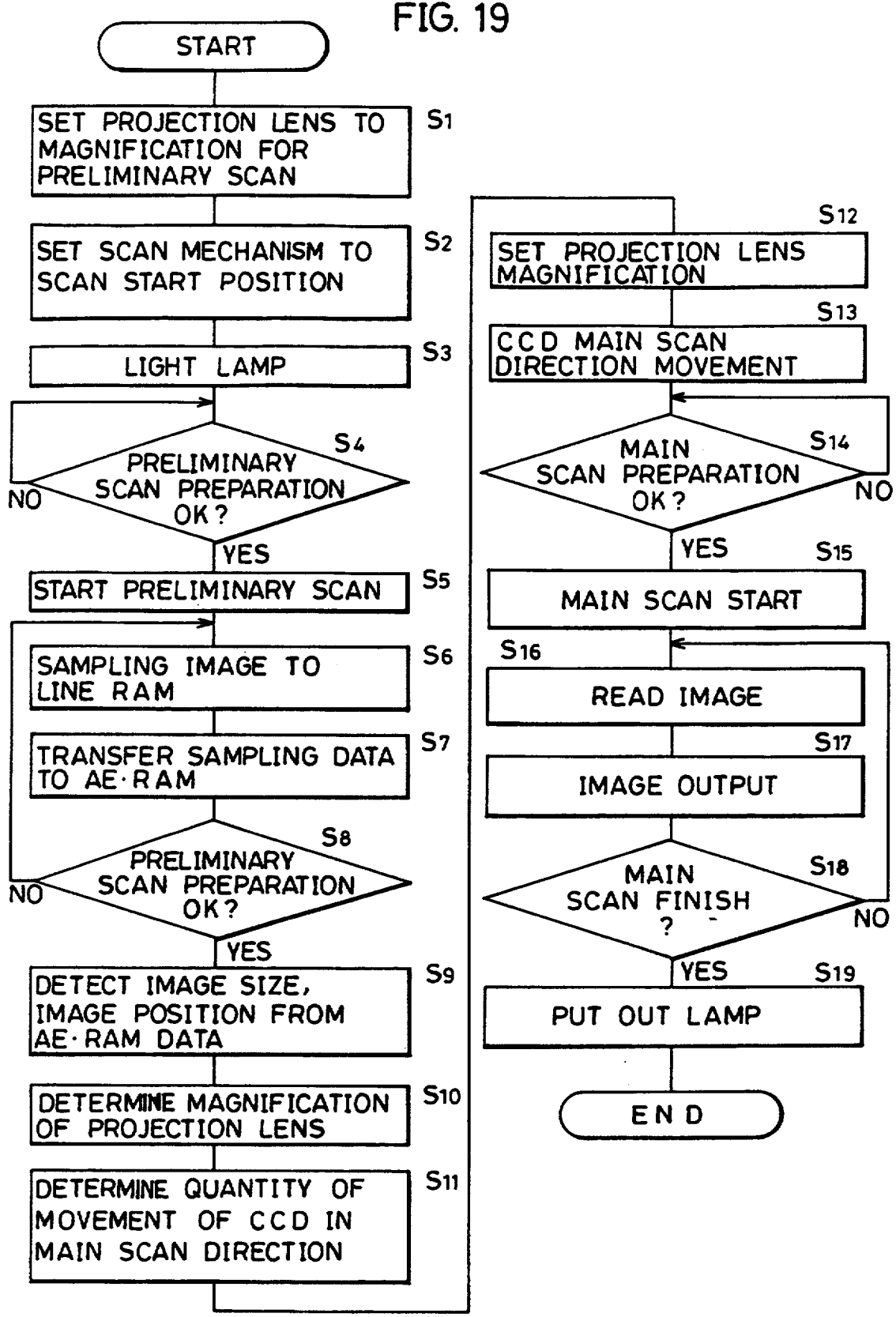
FIG. 19 is a flow chart for describing operation of the image reader according to the fifth embodiment of the present invention.

FIG. 19 is a flow chart for describing operation of the image reader according to the fifth embodiment.

Microfilm 11 is attached to film carrier F and an operator starts operation of the image reader. Then, by a well-known method, image retrieval is performed and a frame image to be read is set to a reading position between an upper glass 14 and a lower glass 15. CPU circuit 41 then gives indication to projection lens drive circuit 89 to set the magnification of projection lens 25a to predetermined low magnification for preliminary scanning (S1). That is, the magnification in preliminary scanning is set to low magnification to read an area where a frame image is possibly formed in image 11 without lacking when it is projected onto CCD line sensor 30.

Also, CCD main scanning direction drive circuit 81 receives indication of CPU circuit 41 and drives drive motor 82. CCD line sensor 30 fixedly provided on carrier plate 62 moves to a predetermined initial position for preliminary scanning. The scanning position for preliminary scanning is predetermined so that a center point in a width direction of microfilm 11 projected on CCD line sensor 30 approximately coincides with a center point in length of pixel line of line sensor 30. Subsequently, film carrier drive circuit 87 receives indication by CPU circuit 41 to drive drive motor 88 and set film carrier F at a scan starting position (S2).

Next, lamp light quantity control circuit 47 receives indication of CPU circuit 41 and lights lamp 21 (S3). As a result, a frame image in microfilm 11 is projected on CCD line sensor 30. Then, operation of S1-S3 is finished, a determination is made as to whether preparation for preliminary scanning has been completed or not (S4), and if the preparation had been finished (result of the determination is YES), S5 is performed. If the preparation for preliminary scanning has not been finished (the result of determination is NO), the determination of S4 is continuously carried out until the preparation is made.

Film carrier F moves at a constant speed along the sub scanning direction from the scan starting position and CCD line sensor 30 starts reading projected frame image (S5). A signal outputted by CCD line sensor 30 is converted into a digital signal by an A/D conversion circuit 48 and data corresponding to 1 line is written into a line RAM 49 (S6). Then, part of or whole the data written into line RAM 49 is transferred to an AE-RAM 44 (S7). Furthermore, film carrier F moves by a distance corresponding to one frame of microfilm 11 in the sub scanning direction, and determines whether preliminary scanning has been finished or not (S8). If preliminary scanning has not finished (the result of determination in S8 is NO), operations of S6 and S7 are continuously carried out until preliminary scanning is finished. If the preliminary scanning has been finished (the result of determination in S8 in YES), S9 is carried out.

That is, on the basis of image data transferred to AE-RAM 44, CPU circuit 41 determines position and size of a projected frame image (S9). The determination of position and size of frame image is made by the following method, for example. (1) Checking a value of data written into AE-RAM 44 for an address of which data value exceeds a certain threshold value, position and size of the frame image are determined. (1) two-dimensional filtering process is applied to data written in AE-RAM 44 to detect an outline of a frame image, and position and size of the frame image are determined.

With the size of frame image determined in the S9, the length of one side of the frame image in the main scanning direction is obtained. The magnification of projection lens 25a is determined to a value at which a side of the frame image projected on CCD line sensor 30 seems to be approximately equal to the length of pixel line in CCD line sensor 30. Also, with position of frame image determined in S9, the distance between a center position in the main scanning direction of the frame image and a center position of pixel line in CCD line sensor 30 is obtained to determine a quantity of movement in the main scanning direction of CCD line sensor 30 (S11). The quantity of movement or the quantity of exposure can be reading conditions in reading a frame image by CCD line sensor 30.

In order to realize magnification determined in the S10, CPU circuit 41 moves motor 90 with projection lens drive circuit 89 to set the magnification of projection lens 25a to the determined magnification (S12). Also, CPU circuit 41 has CCD main scanning direction circuit drive circuit 81 move CCD line sensor 30 according to the quantity of movement of CCD line sensor 30 determined in the S11 (S13).

Next, CPU circuit 41 makes a determination as to whether preparation for scanning has been finished or not (S14), and if the preparation has been finished (YES in S14), performs S15. If the preparation has not finished (NO in S14), it continues to make determination in S14 until the preparation has bee made.

Similarly to the operation of preliminary scanning, film carrier F starts moving at constant speed in the sub scanning direction from the scan starting position S15. CCD line sensor 30 reads a frame image projected on CCD line sensor 30 (S16). A signal outputted from CCD line sensor 30 is converted into a digital signal by A/D converting circuit 22 and then outputted to external devices and the like through image processing circuit 42 and external I/F circuit 43 (S17).

Then, a determination is made as to whether scanning has been finished or not (S18), and if scanning has not been finished (NO in S18), operations of S16 and S17 are continuously carried out until scanning finishes. If scanning has been finished (YES in S18), lamp light quantity control circuit 47 puts out lamp 21 (S19), and operation of the image reader finishes.

According to the image reader according to the present embodiment, in a frame image projected to CCD line sensor 10, position and projection magnification of the projected frame image are corrected without manual operation by an operator so that it is approximately equal to a reading area of CCD line sensor 10. Furthermore, since the magnitude of an image on screen (not shown) can be adjusted by changing optical magnification, a decrease in resolution of read original can be prevented as compared with a conventional example in which magnification change is attempted with software. Furthermore, a decrease in a quantity of software can be expected.

(6) Sixth Embodiment

Figure 20:
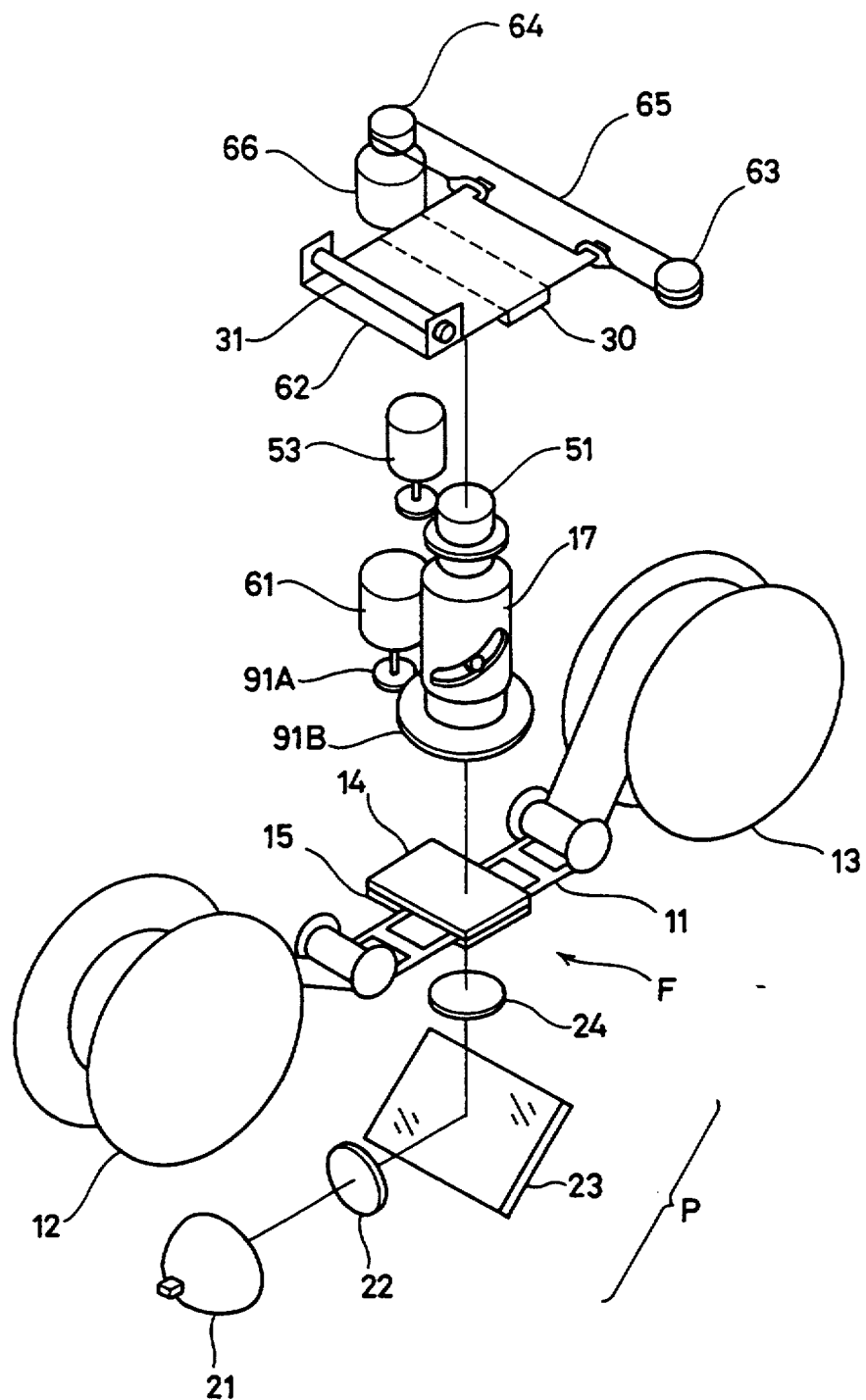
FIG. 20 is a perspective view illustrating schematic structure of an image reader according to the sixth embodiment of the present invention.

FIG. 20 is a structural schematic diagram of an image reader by the sixth embodiment.

In the image reader according to the sixth embodiment, a prism 51 and its drive motor 53 used in the fourth embodiment are added to the image reader according to the fifth embodiment of FIG. 17. Prism 51 is provided on the optical axis between projection lens 25a and CCD line sensor 30. Prism 51 has a function of rotating an original image (a frame image) projected on CCD line sensor 30 around the optical axis. By rotating part of member constituting prism 51 using a driving force of motor 53M, the rotation angle of a projected image by prism 51 can be arbitrarily set. The prism 51 constitutes a part of the optical projection system.

In the operation of the image reader according to the sixth embodiment, operation relating to rotation angle of original image is added to the operation shown in FIG. 19.

A tilt angle with respect to the sub scanning direction axis of an original image is determined from data of AE-RAM 44 sampled in preliminary scanning. According to the tilt angle, a rotation angle of prism 51 is set. Accordingly, the tilt angle between the original image and the subscanning direction axis of CCD line sensor 30 is corrected and an original image as shown in FIG. 4 (D) is obtained by scanning.

Accordingly, even if an original is inclining with respect to a frame of microfilm 11, the inclination with respect to CCD line sensor 30 is corrected, and furthermore, a decrease in resolution due to the correction can be prevented. Other structures and effects are not referred to here so as not to be redundant.

Although reading conditions in scanning, i.e. position in the main scanning direction of CCD line sensor, projection magnification, image rotation angle and the like are set by detecting conditions of original image, i.e. the size, position, inclination angle and the like, in preliminary scanning in the above-described embodiments, it is a matter of course that adjustment of quantity of exposure, determination as to whether which of negative and positive microfilms is being used, and the like can be made on the basis of the preliminary scanning. Furthermore, it is also possible to introduce configuration in which an operator inputs size of an original image not by preliminary scanning. Also, although the positional adjustment in the main scanning direction is made by moving the line sensor in the above-described embodiments, microfilm may be moved, or positional adjustment can be made by an optical projection system. Also, concerning the way of changing magnification, without using a zoom lens, the magnification may be changed by changing conjugate length by moving a lens in an optical axis direction. Also, without performing positional adjustment, magnification adjustment only may be performed. Furthermore, low magnification for detecting position of a projected image and magnification for reading an image may be made switchable between each other, or positional adjustment between a line sensor and a projected image only may be performed.

(7) Seventh Embodiment

Figure 21:
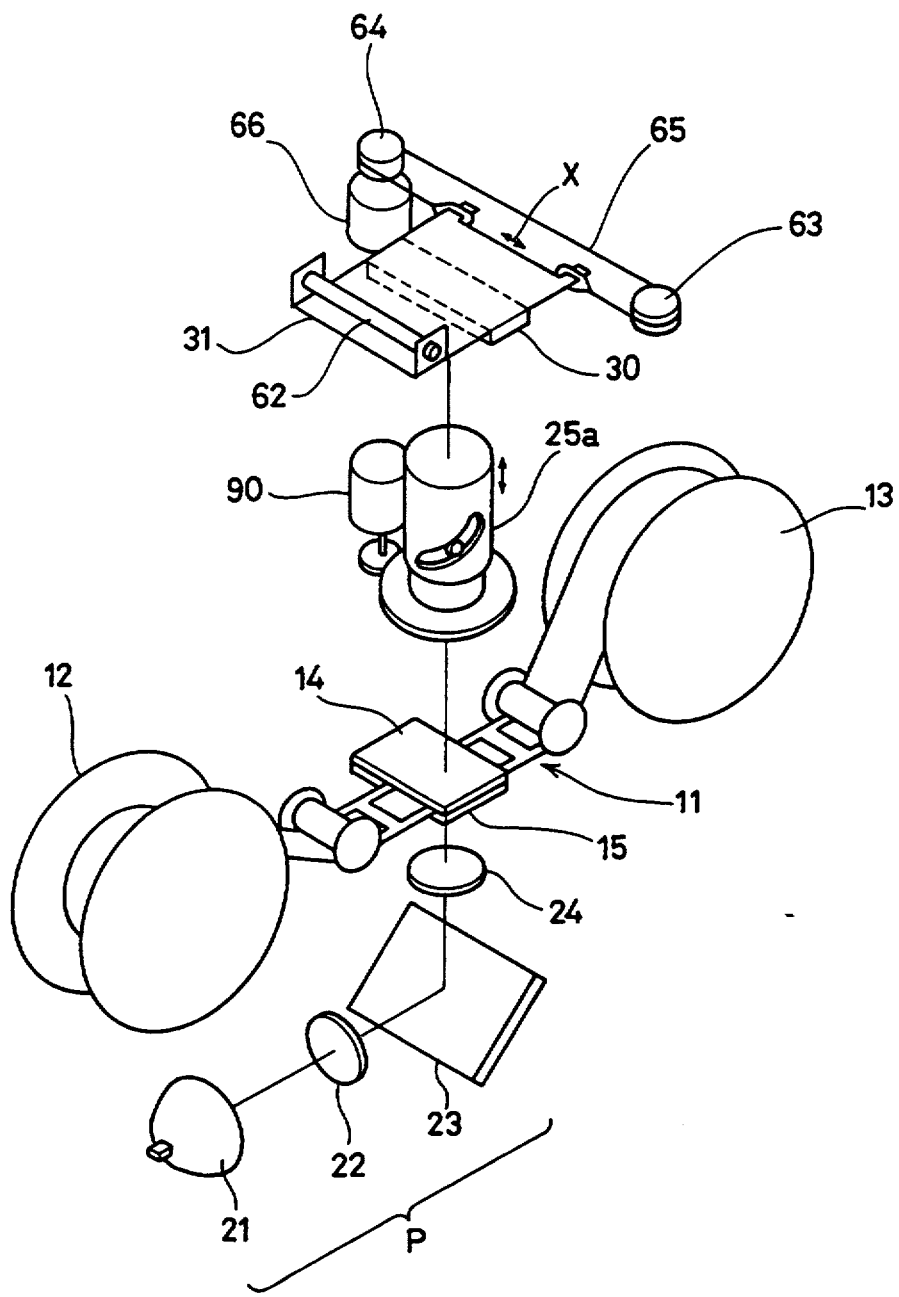
FIG. 21 is a diagram illustrating schematic structure of an image reader in the seventh embodiment of the present invention.

FIG. 21 is a perspective view illustrating configuration of an image reader according to the seventh embodiment of the present invention, which corresponds to FIG. 17 of the fifth embodiment. FIG. 21 and FIG. 17 are almost the same.

CCD line sensor 30 moves in a direction parallel to the main scanning direction (the direction indicated by an arrow X in the figure) integrally with plate 31 by driving of motor 66 to adjust relative position between a projected image and CCD line sensor 30.

Figure 22:
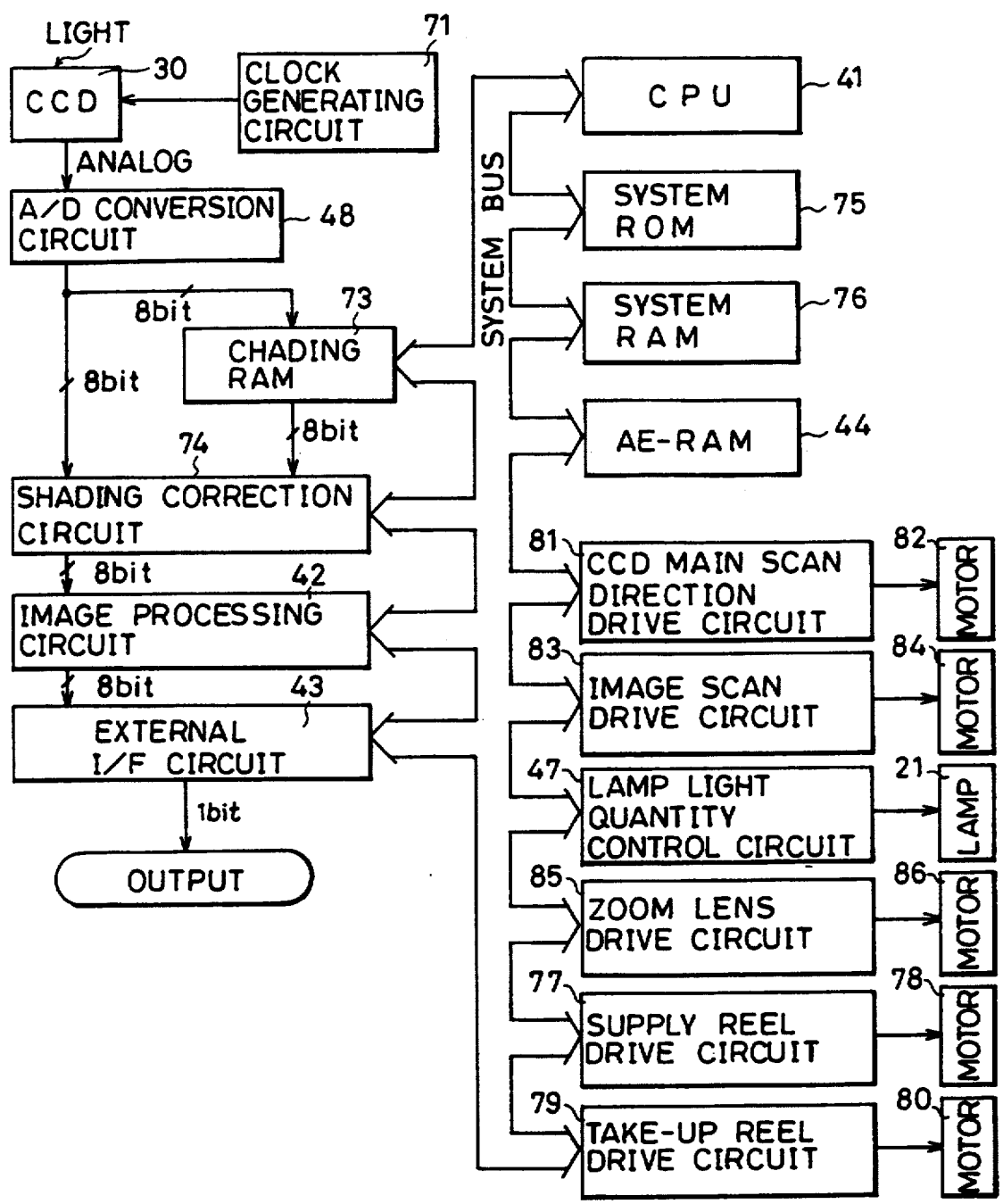
FIG. 22 is a block diagram illustrating a main portion of the image reader according to the seventh embodiment of the present invention.

The system configuration of the microfilm scanner is shown in FIG. 22. As shown in the figure, CCD line sensor 30 has a configuration for outputting an analog signal produced by respective pixels (image-sensing elements) on the basis of a clock signal from a clock generating circuit 71 (on the basis of a shift pulse) to an A/D conversion circuit 48. The digital signal output (a video signal of 8-bit data) of the A/D conversion circuit 48 is then inputted into a shading correction circuit 74. However, when collecting data of optical unevenness and pixel unevenness described later, an output of A/D conversion circuit 48 is inputted in and once stored in shading RAM 73 and then only necessary data are transmitted to an AE-RAM 44 through a system bus. When reading an image, data for shading correction produced on the basis of the data stored in AE-RAM 44 is stored in shading RAM 73 and an output of 8-bit data (a shading correction signal) of the shading RAM 73 is also inputted into shading correction circuit 74. Furthermore, 8-bit data output signal (a video output after correction) of shading correction circuit 74 is inputted into an image processing circuit 42, and an output of 8-bit data of the image processing circuit 42 is outputted as 1-bit data through an external I/F circuit 43.

Shading RAM 73, shading correction circuit 74, image processing circuit 42 and external I/F circuit 43 are connected to CPU 41 and the like through the system bus. CPU 41 is connected through the system bus to a system ROM 75, a system RAM 76 and an AE-RAM 44. Furthermore, the CPU 41 is connected through the system bus to a CCD main scanning direction drive circuit 81, an image scan drive circuit 83, a lamp light quantity control circuit 47, a zoom lens drive circuit 85, a supply reel drive circuit 77 and a take-up reel drive circuit 79, respectively. That is, CPU 41 controls preliminary scanning, main scanning, shading correction processing, image processing and the like on the basis of program stored in system ROM 75.

CCD main scanning direction drive circuit 81 outputs a drive signal to motor 82 for driving plate 31. Image scan drive circuit 83 is for moving film carrier F with motor 84. Zoom lens drive circuit 85 outputs a drive signal to motor 86 to drive zoom lens 25a and changes projection magnification of frame image. Furthermore, supply reel drive circuit 77 and take-up reel drive circuit 79 output drive signals to motors 78 and 80, respectively, to take up and rewind microfilm 11.

In the microfilm scanner according to this embodiment, frame images are read from microfilm 11 according to the following procedure.

First, when a power source of the apparatus is turned on, optical unevenness data and pixel unevenness data for producing data for shading correction are collected with microfilm 11 not being wound around take-up reel 13, that is, without microfilm 11 between upper glass 14 and lower glass 15. The optical unevenness data is data of unevenness of light quantity mainly due to characteristics of optical projection system P and zoom lens 25a, and the data of pixel unevenness is data of output unevenness among respective image-sensing elements of CCD line sensor 30. The method of collecting the data will be described later in detail.

When optical unevenness data and pixel unevenness data have been collected, image retrieval is performed according to a known method and a frame image to be read is set at a reading position between upper glass 14 and lower glass 15. Subsequently, CCD line sensor 30 is set to a predetermined position and the film carrier is moved in the sub scanning direction to perform preliminary scanning. In the preliminary scanning, a position of frame image is detected by CCD line sensor 30.

Then, the most appropriate position in the main scanning direction of CCD line sensor 30 is determined corresponding to a position of frame image detected by the preliminary scanning, and motor 82 is driven. The most appropriate value of position of CCD line sensor 30 in this case is a position where an area in the main scanning direction of a frame image projected on CCD line sensor 30 coincides with the reading area of CCD line sensor 30. In the following, an area in which CCD line sensor 30 can move in the main scanning direction and read an image is referred to as "readable area". That is, as long as a frame image is within the readable area, the frame image can be read at an appropriate position by moving CCD line sensor 30.

Subsequently, again, the film carrier F is moved in the subscanning direction and scanning is performed for reading an image. At this time, on the basis of previously sampled optical unevenness data and pixel unevenness data, data for shading correction corresponding to position of CCD line sensor 30 at that time is produced and image data read by CCD line sensor 30 is subjected to shading correction on the basis of the data for shading correction.

Figure 23:
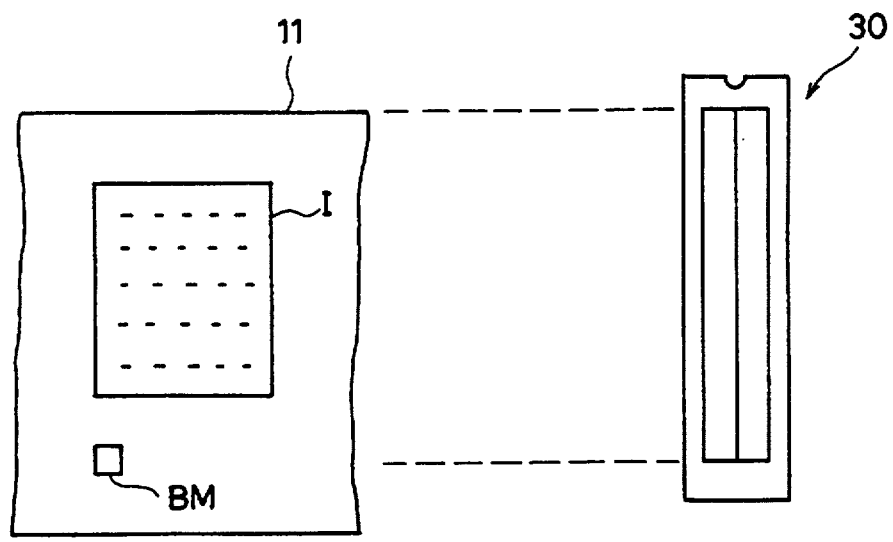
FIG. 23 is a schematic diagram illustrating relative positional relationship and photographic magnification in the main scanning direction of the CCD line sensor and an image projected thereto in preliminary scanning by a microfilm scanner according to the seventh embodiment of the present invention.
Figure 24:
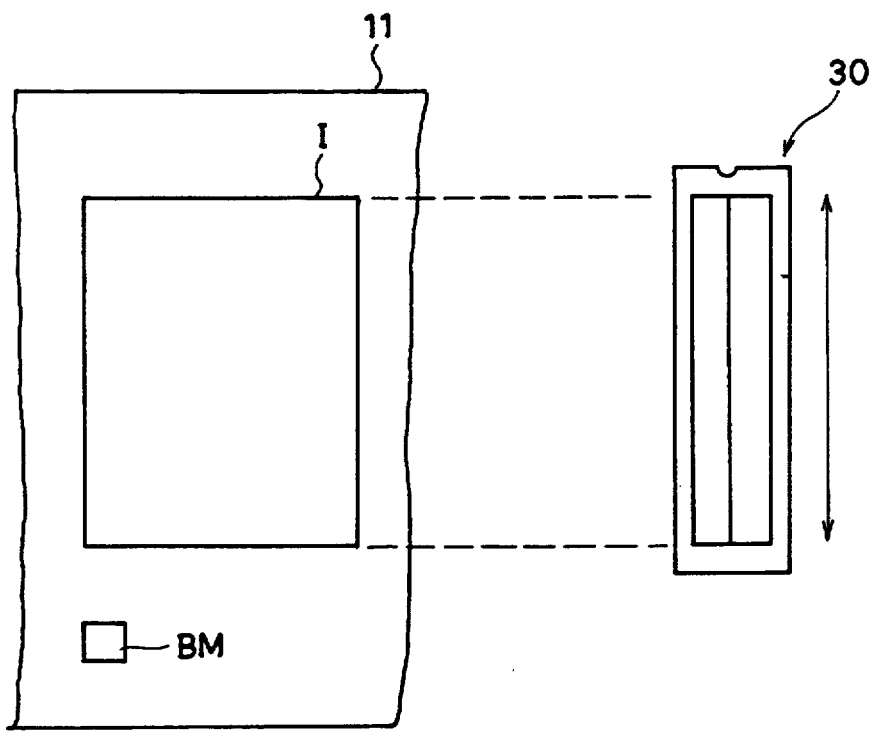
FIG. 24 is a schematic diagram illustrating relative positional relationship and photographic magnification in the main scanning direction of the CCD line sensor and an image projected thereon in main scanning by the microfilm scanner according to the seventh embodiment of the present invention.

FIGS. 23 and 24 are schematic diagrams illustrating relative positional relationship in the main scanning direction of CCD line sensor 30 and an image projected thereto and projection magnification in preliminary scanning and main scanning, respectively.

In the preliminary scanning, the magnification of zoom lens 25a is set smaller than predetermined reading magnification for main scanning, and the entire readable area of microfilm 11 is projected on respective pixels (image-sensing elements) of CCD line sensor 30 as shown in FIG. 23 by radiating predetermined light from lamp 21. Position and the like of frame image I in the readable area of microfilm 11 is thus read out. A blip mark BM for retrieval is formed out of the frame for each frame image I in microfilm 11.

In main scanning, zoom lens 25a is driven by motor 61 to set predetermined reading magnification for main scanning and also CCD line sensor 30 is moved in the main scanning direction to locate the entire projected image in the width of effective pixels (the width for 5000 pixels) of CCD line sensor 30 as shown in FIG. 24 to realize the optimum relative position of the projected image with respect to the CCD line sensor 30. The reading magnification for the main scanning is identical to the projection magnification in collecting optical unevenness data and pixel uneven data.

Figure 28:
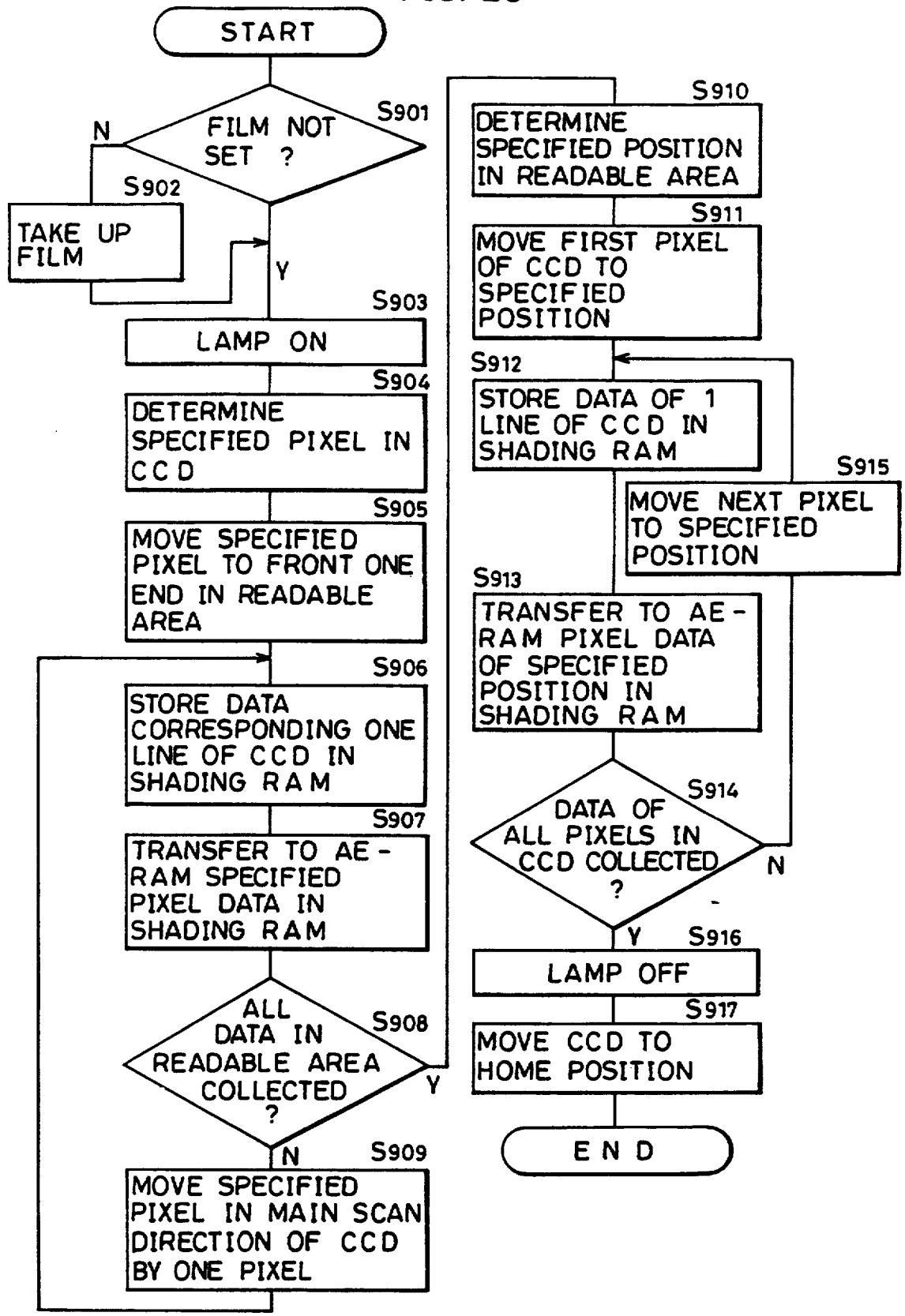
FIG. 28 is a flow chart illustrating a program for obtaining data of illumination unevenness of the optical projecting system and data of output unevenness of respective pixels of the CCD line sensor by the microfilm scanner according to the seventh embodiment of the present invention.

Next, referring to the flow chart of FIG. 28, sampling of optical unevenness data and pixel unevenness data in the microfilm scanner will be described.

When power is supplied to the microfilm scanner, a determination is first made as to whether microfilm 11 is out of the reading position or not (step S901). This is because data for shading correction is produced with no microfilm 11 existing in an optical path from lamp 21 to CCD line sensor 30. When microfilm 11 is out of the reading position, that is, when supply reel 12 is not attached or microfilm 11 is all taken up around supply reel 12, it proceeds to step S903. If microfilm 11 exists at the reading position, motor 78 for driving supply reel is driven to completely take up microfilm 11 around supply reel 12 (S902).

Next, without film provided, lamp 21 is turned on by lamp light quantity control circuit 47 (S903). As a result, light of lamp 21 is radiated to a plurality of pixels (image-sensing elements) of CCD line sensor 30 through optical projecting system P. Also, simultaneously, zoom lens 25a is set so that the projection magnification of an image for CCD line sensor 30 attains a predetermined value which is the same as the above-described magnification for the main scanning. Then, a particular image-sensing element in CCD line sensor 30, e.g., the first image-sensing element located at an end in the arrangement direction is determined to be a specified pixel (S904).

Then, CCD line sensor 30 is moved in the main scanning direction so that the specified pixel is located at front end in the readable area (S905). Here, 1 line of data (5000-bits data) of CCD line sensor 30 is converted into a digital signal in A/D conversion circuit 48 and stored in shading RAM73 (S906). Furthermore, the data of the specified pixel in the 1 line of data thus stored in shading RAM73 is transferred to and stored in AE-RAM44 (S907). Next, a determination is made as to whether data has been collected about the entire readable area (S908).

If collection has not completed, CCD line sensor 30 is moved in the main scanning direction by a distance of a single pixel (S909). For example, motor 66 is driven. Then, it goes back to step S906 to store data for 1 line again in shading RAM73 and data related to the specified pixel in the data is transferred to and stored in AE-RAM44.

Figure 25:
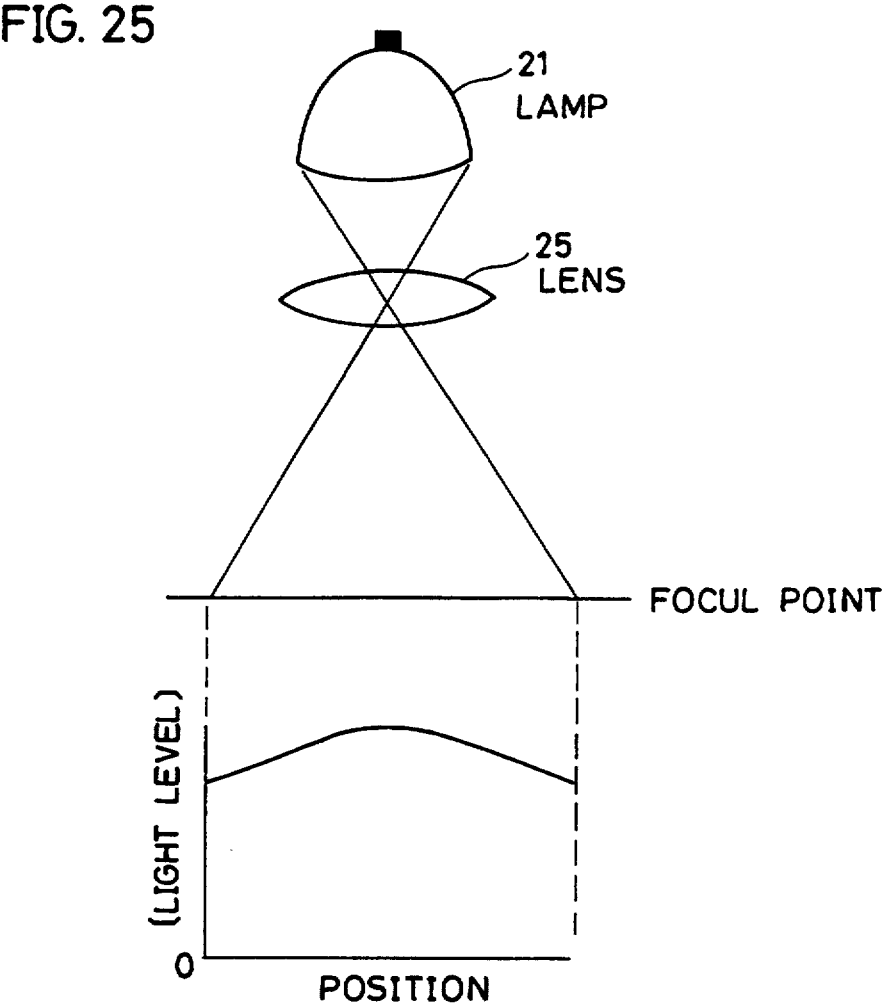
FIG. 25 is a diagram for describing illuminance unevenness of an optical projecting system of the microfilm scanner according+to the seventh embodiment of the present invention.

When data has been collected about the entire readable region (YES in S908), it proceeds to step S910. As a result, illumination data of the entire readable area detected by a single image-sensing element is obtained as shown in FIG. 25. FIG. 25 shows illumination unevenness data of optical projection system P at a focal surface, that is, optical unevenness data.

In step S910, a specified position in the readable area is determined. This can be determined about an arbitrary position in the readable area. CCD line sensor 30 is then moved in the main scanning direction and a first image-sensing element thereof is located corresponding to the specified position (S911).

Then, 1 line data of CCD line sensor 30 (5000-bits data) is stored in shading RAM73 (S912), and pixel data of the specified position in the data stored in shading RAM73 (data of the first pixel) is transferred to AE-RAM44 (S913). Subsequently, a check is made as to whether or not data has been collected about all the pixels (5000 pixels) of CCD line sensor 30 (S914). If it is not finished, the next pixel (in turn starting with the second pixel) is moved to the specified position (S915) and the pixel data are sequentially stored in AE-RAM44 (it is repeated as S912→S913→S914→S915→S912).

Obtaining pixel data about all the pixels in CCD line sensor 30 (YES in S914), lamp 21 is turned off (S916) and CCD line sensor 30 is moved to a predetermined home position (S917), and the routine is finished. The "home position" is predetermined so that the entire readable area is precisely projected onto CCD line sensor 30 in preliminary scan. FIG. 22 shows unevenness of output data (pixel unevenness data) of respective pixels (image-sensing elements) thus produced on the basis of the specified position.

Figure 29:
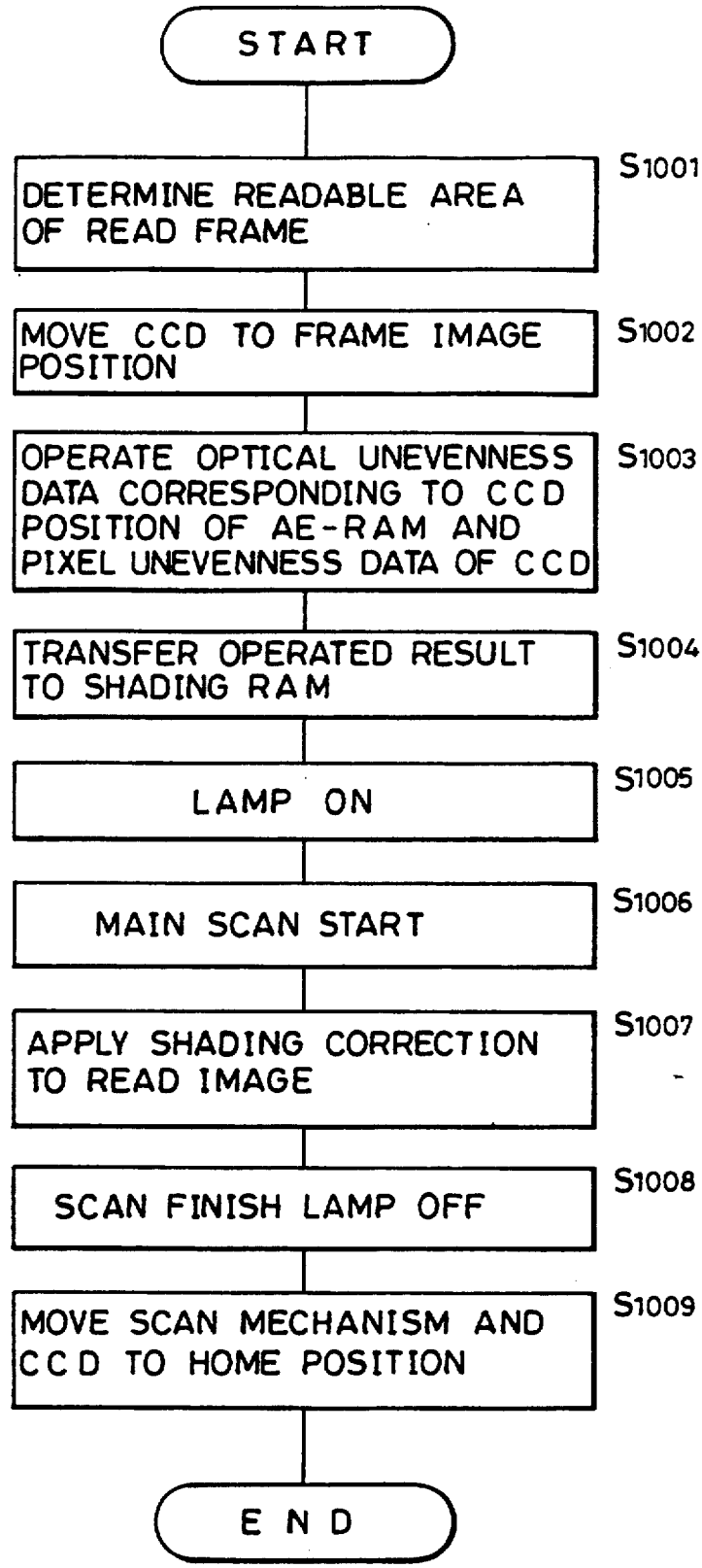
FIG. 29 is a flow chart illustrating a program of the CPU for performing shading correction by the microfilm scanner according to the seventh embodiment of the present invention.

Next, referring to the flow chart of FIG. 29, description will be given on shading correction of image data in main scanning.

First, an image area to be read by CCD line sensor 30 is determined corresponding to a position of frame image detected by preliminary scanning (S1001). In the present embodiment, by performing preliminary scanning, an image area to be read by CCD line sensor 30 is automatically determined, but an image area to be read may be manually inputted by an operator. Then, by driving motor 66, CCD line sensor 30 is moved corresponding to the frame image position (S1002). At this time, zoom lens 25a is set so that the projection magnification attains a predetermined value for main scanning.

Then, using data for shading correction stored in AE-RAM44, that is, optical (illumination) unevenness data corresponding to a position of CCD line sensor 30 and output unevenness data of respective pixels in CCD line sensor 30, specific data for shading correction at a position in the main scanning direction of the CCD line sensor 30 is operated (S1003). For example, it is operated according to the following expression.

That is, $$Zn = Xn + \left\{ Yn - \left( \sum_{n=1}^{n=5000} Yn/5000 \right) \right\}.$$

Figure 26:
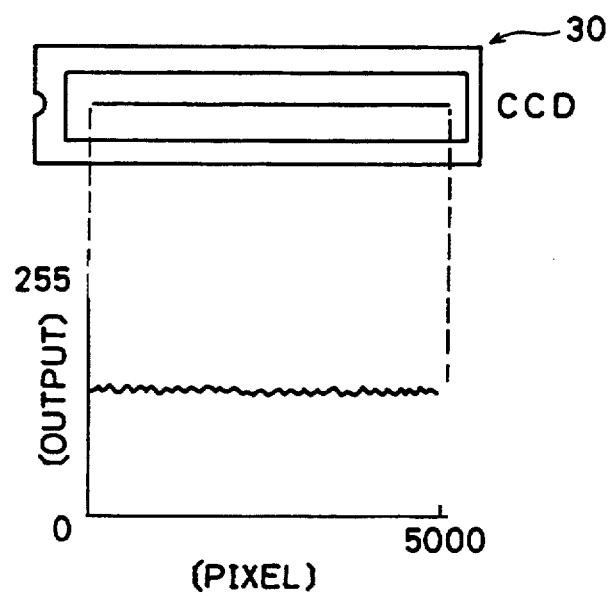
FIG. 26 is a diagram for describing output unevenness of pixels of the line sensor of the microfilm scanner according to the seventh embodiment of the present invention.
Figure 27:
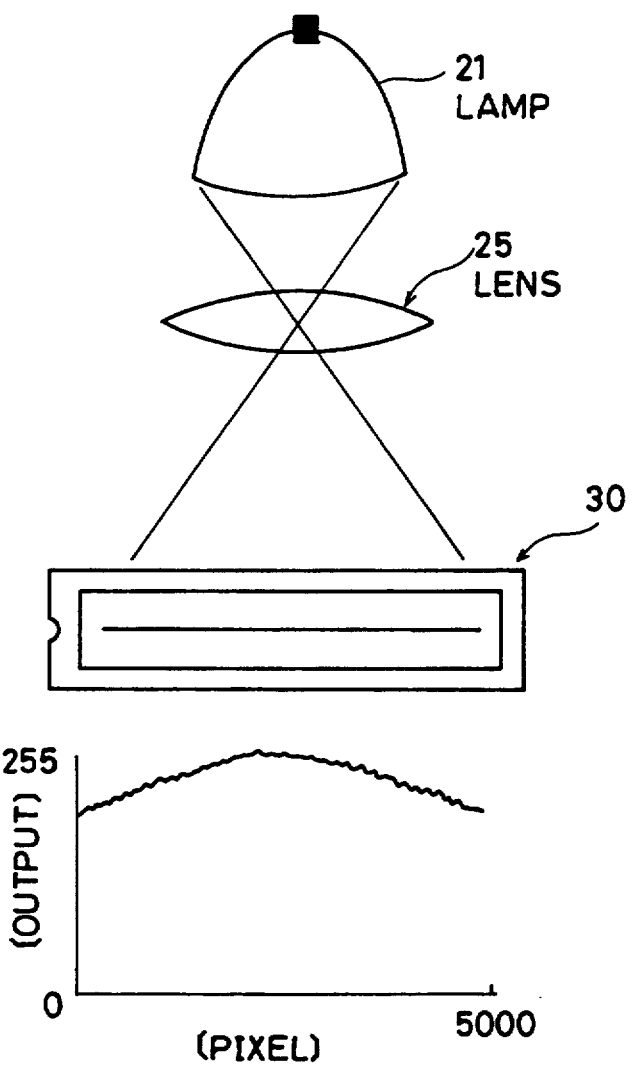
FIG. 27 is a diagram for describing output unevenness of the microfilm scanner according to the seventh embodiment of the present invention.

Herein, Xn (n = an integer from 1 to 5000, the same in the following) expresses illuminance (optical) unevenness data corresponding to a position of CCD line sensor 30, Yn expresses output unevenness data of respective pixels in CCD line sensor 30, and Zn expresses composite data to be obtained. FIG. 27 shows one example of data for shading correction obtained by composing optical unevenness data of FIG. 25 and pixel unevenness data of FIG. 26.

The result Zn of the operation is written into shading RAM73 (S1004). Data for shading correction at the position of CCD line sensor 30 is thus produced and the main scanning is performed thereafter.

That is to say, lamp 21 is turned on (S1005) to start main scanning (S1006). Image data read in the scanning is transferred to shading correction circuit 74, where shading correction is applied to the image data on the basis of the shading correction data Zn (S1007).

When the scanning is finished, lamp 21 is turned off (S1008), and the scan mechanism and CCD line sensor 30 are moved to the above-noticed home position (S1009). By composing illumination unevenness data shown in FIG. 25 and pixel unevenness data shown in FIG. 26 corresponding to the position of CCD line sensor 30 as described above, correction data shown in FIG. 27 is produced to shading-correct read image data. Also when CCD line sensor 30 moves in the main scanning direction, shading correction can be made corresponding to that position.

(8) Eighth Embodiment

Figure 30:
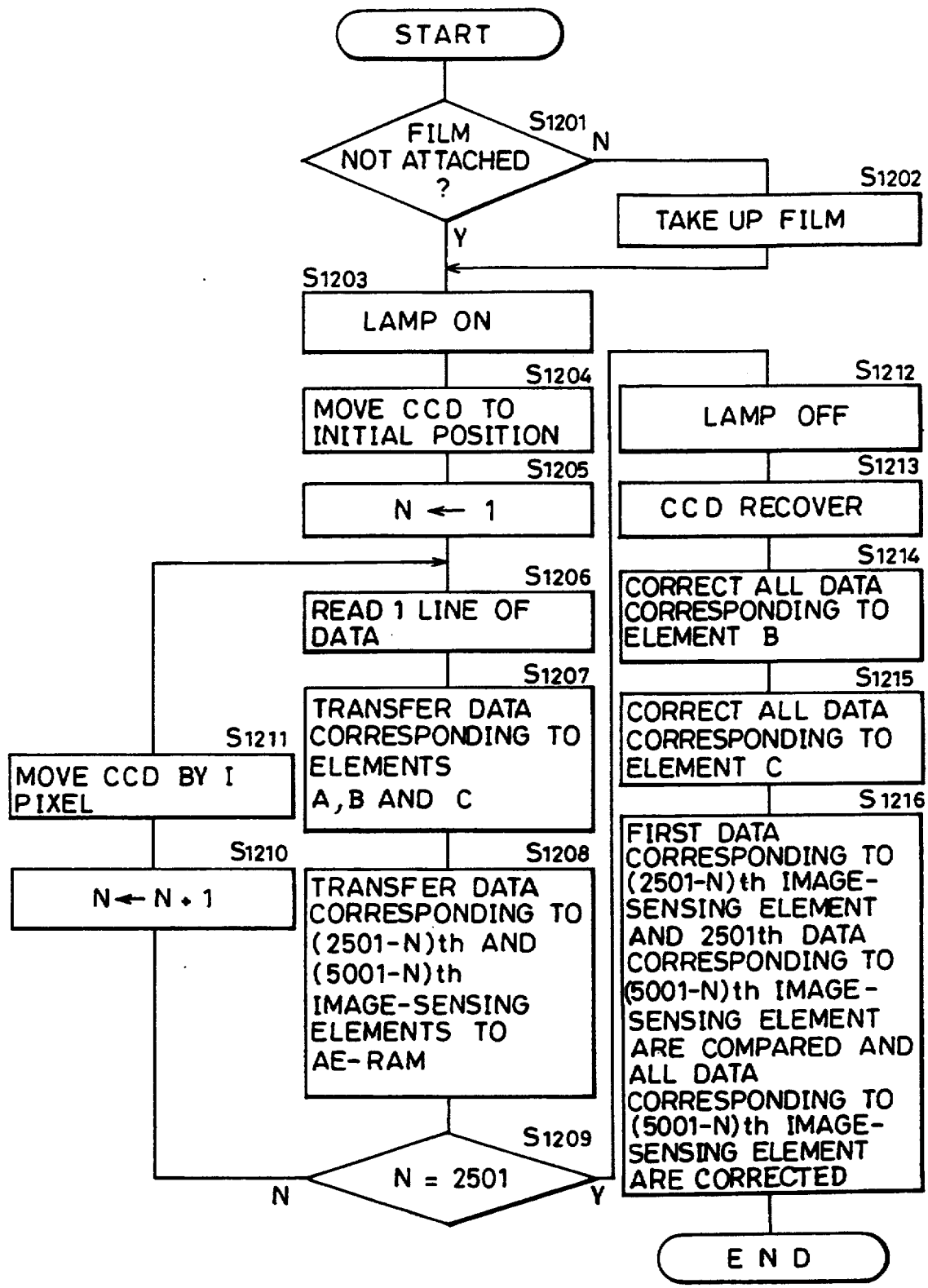
FIG. 30 is a flow chart illustrating a program of the CPU for obtaining data of illumination unevenness of the optical projecting system and data of output unevenness of respective pixels of the CCD line sensor by the microfilm scanner according to the eighth embodiment of the present invention.

FIG. 30 is a flow chart illustrating a scan program for sampling optical unevenness data of CPU and pixel unevenness data according to the eighth embodiment of the present invention. In this embodiment, movement in the main scanning direction of CCD line sensor 30 for producing illumination unevenness data performed in the fifth embodiment and that for producing unevenness data of respective pixels are achieved by single movement in the same direction of CCD line sensor 30, and also its moving range is reduced compared to the first embodiment.

That is to say, a check is made as to whether film is out of an optical path or not (S1201) and if it is not, the film is taken up (S1202). Lamp 31 is then lighted (S1203) and CCD line sensor 30 is moved to a predetermined initial position (S1204). In the eighth embodiment, an area corresponding to 7500 pixels is a readable area, so that the initial position is set diverting in the main scanning direction by 1250 pixels from a position where the center of an image-sensing portion of CCD line sensor 30 coincides with an optical axis of zoom lens 25a.

Now, 1 is substituted into a variable (counter) N (S1205), and output data of 1 line of pixels is read by CCD line sensor 30 (S1206). Here, pixel output data corresponding to the first image-sensing element (hereinafter, referred to as element A) in CCD line sensor 30, output data corresponding to the 2500th image-sensing element (hereinafter, referred to as element B), and output data corresponding to the 5000th image-sensing element (hereinafter, referred to as element C) are written into predetermined areas in AE-RAM44 (S1207). This is for collecting data of illumination unevenness. Also, output data corresponding to the (2501-N)th image-sensing element and output data corresponding to the (5001-N)th image-sensing element in CCD line sensor 30 are written into other areas of AE-RAM44 (S1208). This is for collecting data of pixel unevenness about respective pixels (image-sensing elements) of CCD line sensor 30.

With the counter N, a check is then made as to whether N=2501 or not (S1209). If it is not N=2501 yet, counter N is incremented only by 1 (S1210) and CCD line sensor 25 is moved in the main scanning direction by one pixel (S1211). Then, 1 line of data is read (S1206), illumination unevenness data is collected (S1207), and pixel unevenness data is collected (S1208). These steps are repeated (S1206→S1207→S1208→S1209→S1210→S1211→S1206).

When the value of the counter N thus attains 2501 (YES in S1209), data for shading correction is being stored in respective areas of AE-RAM44, so that lamp 21 is put out (S1212) and CCD line sensor 30 is moved back to the initial position (S1213).

Furthermore, by applying the following operation on the basis of the data stored in respective areas, data for shading correction is calculated and produced. That is, data outputted by element A of CCD line sensor 30 at the 2500th time (data outputted when N=2500) is compared with data outputted by element B at the first time (data outputted when N=1), and all of 2501 illumination unevenness data detected by element B are corrected on the basis of the result of comparison (S1214). That is, making the first data of element B coincide with 2500th data of element A, data at and after the second time corresponding to element B is increased or decreased in the same ratio as the first data.

Then, 2501th data in data after correction corresponding to the element B is compared with the first data corresponding to element C, and all illumination unevenness data detected by element C is similarly corrected on the basis of the result of comparison (S1215). As a result, respective illumination unevenness data detected by three image-sensing elements (elements A, B, C) are matched to produce optical unevenness data about the entire readable area. Although sampling of optical unevenness data is achieved using three image-sensing elements in the present embodiment, if a readable area is small, by increasing the number of elements used, the range of movement of CCD line sensor 30 when sampling can be further decreased.

Also, in the next step S1216, data outputted by the (2501-N)th image-sensing element at the first time is compared with data outputted by the (5001-N)th image-sensing element at the 2500th time, and all the data outputted by the (5001-N)th image-sensing element are corrected on the basis of the result of comparison to obtain one line (5000 pixels) of pixel unevenness data of CCD line sensor 30. In this case, the (5001-N)th image-sensing element is to output, at the 2501th time, data identical to the first data of the (2501-N)th image-sensing element by movement of CCD line sensor 30 by step of 1 pixel, so that the correction is accomplished so that the 2501th data of the (5001-N)th image-sensing element coincides with the first data of the (2501-N)th image-sensing element.

As described above, in the eighth embodiment, sampling of pixel output unevenness data and illumination unevenness data can be accomplished by a single movement of CCD line sensor 30, and production of data for shading correction can be achieved effectively. Also, as compared to the first embodiment, the quantity of movement of CCD line sensor when sampling is reduced. Other structures and effects are the same as those of the seventh embodiment.

(9) Ninth Embodiment

Next, the ninth embodiment of the present invention will be described. In this embodiment, an image scanner having the same structure as that in the seventh embodiment is also used, where the line sensor is previously moved in the main scanning direction and shading correction data at a plurality of positions are sampled and stored. When reading microfilm, an image signal is corrected on the basis of the stored data. The ninth embodiment is different from the seventh embodiment in that sampling of data for shading correction and shading correction are achieved in units of one line data.

Figure 31:
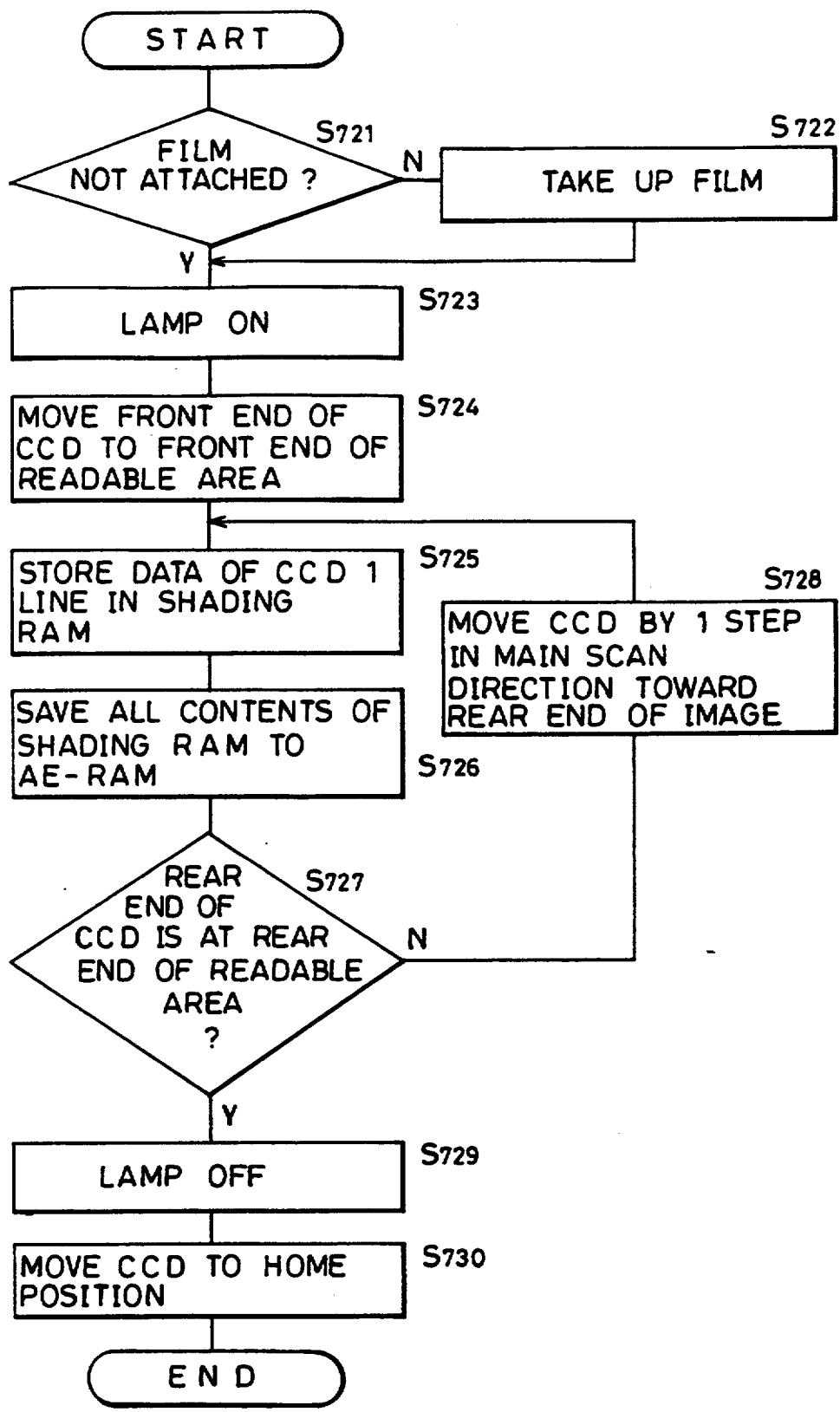
FIG. 31 is a flow chart illustrating a program of a CPU for obtaining data for shading correction by a microfilm scanner according to the ninth embodiment of the present invention.

FIG. 31 is a flow chart showing sampling procedure in the ninth embodiment. Referring to FIG. 31, the ninth embodiment will be described.

Similarly to the seventh embodiment, one line of data of CCD line sensor 30, i.e., current occurring in a plurality of photoelectric conversion elements by light irradiated from lamp 21 is extracted for 5000 pixels, which are converted into a digital signal at A/D conversion circuit 48 and stored in shading RAM73 (S725). Furthermore, all of one line of data thus stored in shading RAM73 (data for 5000 pixels) are transferred to, saved and stored in AE-RAM44 (S726). The shading correction data is obtained as data including ones by the optical unevenness and ones by the pixel unevenness.

Figure 32:
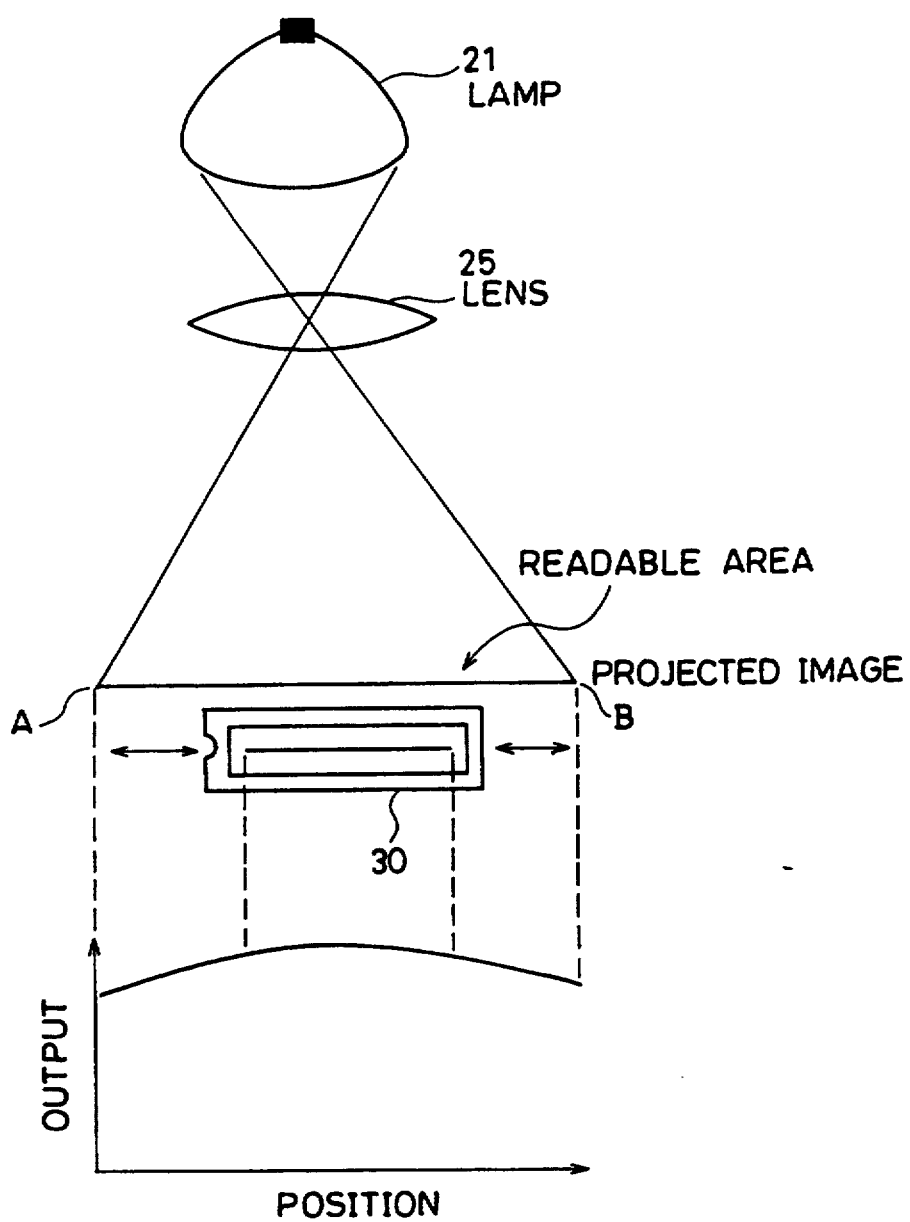
FIG. 32 is a schematic diagram for describing a method of producing data for shading correction by the microfilm scanner according to the ninth embodiment of the present invention.

Next, a determination is made as to whether a photoelectric conversion element at a rear end of CCD line sensor 30 is located at a rear end of a readable area (B in FIG. 32) or not (S727). When the rear end of photoelectric conversion elements is not located at the rear end of the readable area, CCD line sensor 30 is moved in the main scanning direction by one step toward the rear end of the readable area (S728). The moving step can take a value corresponding to movement by a single photoelectric conversion element, for example, or a value corresponding to movement by a plurality of photoelectric conversion elements. For example, suppose that motor 29 is driven corresponding to predetermined pulses to move film carrier F in the X direction by a predetermined distance. Then, going back to step S725, data is read at this position and one line of data (data for 5000 pixels) is again stored in shading RAM73, and further the data is transferred to and stored in AE-RAM44 (S726). By repeating the steps S705, S706, S707, S708, as shown in FIG. 32, CCD line sensor 30 is moved in the main scanning direction and data for shading correction is stored in AE-RAM44 for every moving step. That is to say, data for shading correction at a plurality of positions of CCD line sensor 30 in the main scanning direction are sampled.

The operation after that is the same as the fifth embodiment, so that the description is not repeated.

Next, referring to the flow chart of FIG. 33, description will be given upon shading correction of image data in main scanning. Operation of and before S802 is the same as the seventh embodiment.

Data for shading correction stored in AE-RAM44, that is, data for shading correction corresponding to a stop position of CCD line sensor 30 is read from the AE-RAM44 and transferred to shading RAM73 (S803). When data for shading correction at position of the CCD line sensor 30 is thus obtained, main scanning is performed thereafter.

That is to say, lamp 21 is turned on (S804), and the main scanning is started (S805). Image data read by CCD line sensor 30 in the main scanning is transferred to shading correction circuit 74, where shading correction is applied to image data on the basis of the data for shading correction (S806).

When the main scan is finished, lamp 21 is turned off (S807) and the scanning system is reset (S808). For example, the scanning mechanism and CCD line sensor 30 are moved to the above-described home position. As described above, even if positions of frame images I differ for each frame image I in the main scanning direction, the positions are detected and the most appropriate shading correction can be applied to the read image with data for shading correction corresponding to those positions. The above-mentioned step width can be set on the basis of memory capacity of AE-RAM44. An increase in the moving step width can save memory capacity.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus, comprising:
    a line sensor having a plurality of photoelectric conversion elements provided in a first direction, said line sensor having a length in the first direction;
    projecting means for projecting an original image on said line sensor;
    said line sensor and projecting means are arranged such that a projected original image has a width on the line sensor that is not greater than the length of the line sensor;
    scanning means for relatively moving a projected image projected by said projecting means onto said line sensor in a second direction intersecting said first direction;
    adjusting means for adjusting a relative position in said first direction of said line sensor and said projected image so that the entire width of the projected image is projected onto said line sensor;
    detecting means for detecting positional deviation with respect to said first direction of said line sensor and said projected image in accordance with an output of said line senor; and
    control means for controlling said adjusting means corresponding to a detected result of said detecting means and for controlling the scanning means to scan the entire projected original image in one scanning operation.

2. The image reading apparatus according to claim 1, wherein said adjusting means includes a supporting member supporting said line sensor and movable in said first direction.

3. The image reading apparatus according to claim 1, wherein said projecting means includes a lens member for imaging said projected image on said line sensor, and said adjusting member includes a supporting member supporting said lens member and movable in said first direction.

4. The image reading apparatus according to claim 1, wherein said control means controls said detecting means so that said detecting means performs a preliminary scanning before an original image reading operation, determines an image area of said projected image read in said preliminary scanning, and detects said positional deviation on the basis of the determination.

5. The image reading apparatus according to claim 1, wherein said control means controls said adjusting means so that there is no positional deviation quantity in said first direction detected by said detecting means.

6. The image reading apparatus according to claim 1, wherein the length in which the plurality of photoelectric conversion elements of said line sensor are arranged is approximately equal to the width of the image area in said first direction of the projected image.

7. An image reading apparatus, comprising:

a line sensor having a plurality of photoelectric conversion elements arranged in a first direction, said line sensor having a length in the first direction;

projecting means for projecting an original image on said line sensor;

said line sensor and projecting means are arranged such that a projected original image has a width on the line sensor that is not greater than the length of the line sensor;

scanning means for relatively moving a projected image projected by said projecting means onto said line sensor in a second direction intersecting said first direction;

first detecting means for detecting an inclination between the first direction of said line sensor and a direction of one side of the projected image in accordance with an output of said line sensor;

image rotating means for relatively rotating said line sensor and the projected image corresponding to the inclination detected by said first detecting means;

adjusting means for adjusting a relative position in said first direction of said line sensor and said projected image so that the entire width of the projected image is projected onto said line sensor;

second detecting means for detecting positional deviation with respect to said first direction of said line sensor and said projected image in accordance with said output of said line sensor; and control means for controlling said adjusting means corresponding to the detected result of said second detecting means and for controlling the scanning means to scan the entire projected image in one scanning operation.

8. The image reading apparatus according to claim 7, wherein said image rotating means includes a prism provided on a projection optical axis of said projecting means and a member for supporting the prism rotatably around the projection optical axis.

9. The image reading apparatus according to claim 8, wherein said control means controls said first detecting means so that said first detecting means performs preliminary scanning before original image reading operation and detects inclination on the basis of the projected image read in the preliminary scanning.

10. The image reading apparatus according to claim 9, wherein said control means operates a quantity of adjustment by said adjusting means according to positional deviation with respect to said first direction detected by said second detecting means in said preliminary scanning and angle of rotation executed by said image rotating means.

11. An image reading apparatus, comprising:

a line sensor having a plurality of photoelectric conversion elements provided in a first direction, said line sensor having a length in the first direction and outputting image data;

a projection lens which is arranged between an original and the line sensor, and which projects the original image onto said line sensor, the projected original image having a width on the line sensor being not greater than the length of the line sensor;

a detector which detects positional deviation with respect to said first direction of said line sensor and said projected original image in accordance with the image data of said projected original image outputted from said line sensor;

an adjustor which is connected to a driving source to adjust a relative position of said line sensor and said projected original image in accordance with the detection of the detector so that the entire width of the projected original image is projected onto said line sensor; and a scanner which scans the entire projected original image adjusted by said adjustor in one scanning operation by said line sensor.

12. An image reading apparatus according to claim 11, wherein said adjustor includes a support member supporting said line sensor and which is movable in said first direction.

13. An image reading apparatus according to claim 11, wherein said adjustor includes a support member supporting said projection lens and which is movable in said first direction.

14. An image reading apparatus according to claim 11, wherein said scanner performs preliminary scanning before said one scanning operation and said detector detects the positional deviation in accordance with image data from the preliminary scanning operation.

15. An image reading apparatus, comprising:

a line sensor having a plurality of photoelectric conversion elements provided in a first direction, said line sensor having a length in the first direction and outputting image data;

a projection lens which is arranged between an original and the line sensor, and which projects the original image onto said line sensor, the projected original image having a width on the line sensor being not greater than the length of the line sensor;

a first detector which detects inclination between a first direction of said line sensor and a direction of one side of the projected original image in accordance with the image data of said projected original image outputted from said line sensor;

an image rotator which relatively rotates said line sensor and the projected original image corresponding to the inclination detected by said first detector;

a second detector which detects positional deviation with respect to said first direction of said line sensor and said projected original image relatively rotated by said image rotator in accordance with the image data of said projected original image outputted from said line sensor;

an adjustor which is connected to a driving source to adjust a relative position of said line sensor and said projected original image in accordance with the detection of the detector so that the entire width of the projected original image is projected onto said line sensor; and a scanner which scans the entire projected original image which has been relatively rotated by said image rotator and adjusted by said adjustor in one scanning operation by said line sensor.

16. An image reading apparatus according to claim 15, wherein said image rotator includes a prism provided on a projection optical axis of said projection lens and a member supporting the prism rotatably around the projection optical axis.

17. An image reading apparatus according to claim 15, wherein said scanner performs preliminary scanning before said one scanning operation and said first and second detector detect the inclination and the positional deviation in accordance with the image data of the preliminary scanning operation.

18. An image reading method in which an original image is projected onto a line sensor including a plurality of photoelectric conversion elements arranged in a first direction and read, said line sensor having a length in said first direction and said projected image having a width not greater than said length, comprising the steps of:

detecting a quantity of deviation of said line sensor and said projected image in said first direction using said line sensor;

moving a relative position of said line sensor and said original image to remove a detected deviation; and reading the entire projected image by moving said line sensor in a second direction intersecting said first direction in one scanning operation with said movement having finished.

19. The image reading apparatus according to claim 4, wherein said control means controls relative movement in said second direction by said scanning means and relative movement in said first direction by said adjusting means in said preliminary scanning.

20. The image reading apparatus according to claim 19, wherein said control means stops relative movement in said first direction by said adjusting means when said detecting means detects that there is no positional deviation in said preliminary scanning.

* * * * *